United States Patent
Kawaguchi

(10) Patent No.: US 9,432,646 B2
(45) Date of Patent: Aug. 30, 2016

(54) IMAGE PROCESSING APPARATUS, IMAGE PROCESSING METHOD, PROGRAM AND ELECTRONIC APPARATUS

(71) Applicant: Sony Corporation, Tokyo (JP)

(72) Inventor: Shunji Kawaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/597,753

(22) Filed: Jan. 15, 2015

(65) Prior Publication Data

US 2015/0208046 A1    Jul. 23, 2015

(30) Foreign Application Priority Data

Jan. 22, 2014   (JP) ................. 2014-009180

(51) Int. Cl.
*H04N 5/235* (2006.01)
*H04N 9/69* (2006.01)

(52) U.S. Cl.
CPC .......... *H04N 9/69* (2013.01); *H04N 2209/042* (2013.01)

(58) Field of Classification Search
CPC ...... H04N 9/045; H04N 9/646; H04N 5/234; H04N 5/235; H04N 5/2351
See application file for complete search history.

(56) References Cited

U.S. PATENT DOCUMENTS

| 2006/0158529 A1* | 7/2006 | Katagiri | H04N 3/155 348/222.1 |
| 2008/0043120 A1* | 2/2008 | Mitsunaga | H04N 1/4092 348/238 |
| 2011/0063465 A1* | 3/2011 | Nanu | G06T 5/008 348/222.1 |

FOREIGN PATENT DOCUMENTS

JP   09-331469 A   12/1997
JP   2004-221644 A   8/2004

* cited by examiner

*Primary Examiner* — Tuan Ho
(74) *Attorney, Agent, or Firm* — Sheridan Ross, PC

(57) ABSTRACT

According to an embodiment of the present disclosure, there is provided an image processing apparatus including a comparing unit to perform comparison using at least one of a maximum value and an average value of luminance signals of an input image, with a saturation level as a reference of comparison, the saturation level being a level of light accumulation performed for a predetermined time length which is one of a plurality of time lengths for accumulating light in imaging of the input image; a tone curve generator to generate a tone curve to be used for performing compression processing to luminance gradation of the input image, on the basis of a result of the comparison being made; and a luminance gradation compression processor to perform compression processing to luminance gradation of the input image, according to the tone curve being generated.

20 Claims, 17 Drawing Sheets

IMAGE PROCESSING APPARATUS, IMAGE PROCESSING METHOD, PROGRAM AND ELECTRONIC APPARATUS

CROSS REFERENCE TO RELATED APPLICATIONS

This application claims the benefit of Japanese Priority Patent Application JP2014-009180 filed Jan. 22, 2014, the entire contents of which are incorporated herein by reference.

BACKGROUND

The present disclosure relates to image processing apparatuses, image processing methods, programs and electronic apparatuses, and in particular, to an image processing apparatus, an image processing method, a program and an electronic apparatus capable of performing tone compression which is able to prevent deterioration of image quality, with a simple configuration.

From the past, in electronic apparatuses provided with imaging function such as digital still cameras and digital video cameras, solid state image sensors which include, for example, CCD (Charge Coupled Device), CMOS (Complementary Metal Oxide Semiconductor) image sensor, or the like have been used.

An imaging apparatus in which such a solid state image sensor is employed has a narrower dynamic range than that of, for example, an imaging apparatus in which an optical film is employed. As a result, with the imaging apparatus in which the solid state image sensor had been employed, in cases where imaging was performed against backlight, "blown out highlights" (over-exposures), which is a loss of gradation in a bright part, and "crushed blacks" (under-exposures), which is a loss of gradation in a dark part, had easily occurred. In response to this, recently, it has become possible to obtain RAW image signals which have a luminance gradation at wide dynamic range comparable to that of photographs using optical films, with progresses in solid state image sensors (low noise) and technologies of synthesizing bracketed exposures.

Meanwhile, there is still a limit in the luminance gradation that can be rendered, with file formats for storing the imaged videos and still images (e.g., JPEG (Joint Photographic Experts Group), MPEG (Moving Picture Experts Group), etc.), commonly-used display devices such as CRT (Cathode Ray Tube) and LCD (Liquid Crystal Display) or printers. In other words, the dynamic range that can be rendered by using a display device may be narrow. Because of this, even if the RAW image signals having the luminance gradation at such a wide dynamic range comparable to that of photographs using optical films (hereinafter referred to as "wide dynamic range image") were to be obtained, such a wide dynamic range might not be able to be stored or rendered (displayed, printed, etc.). It should be noted that the RAW image signals are output signals of a so-called "imager".

Accordingly, there is a demand for a dynamic-range compression processing technology to perform compression of the luminance gradation of a wide dynamic range image to narrow the dynamic range, and to convert it to an image able to be rendered by existing apparatuses such as display devices (hereinafter referred to as "narrow dynamic range image").

For example, Japanese Patent Application Laid-open No. Hei 9-331469 discloses a technology of adaptively determining a redistribution of gradation on the basis of a histogram of luminance of a wide dynamic range image. In this technology, by processing such as making a histogram from the gradation of the wide dynamic range image, the gradation is redistributed in accordance with a gradation of narrower dynamic range of the display device or the like, thereby generating a narrow dynamic range image. Further, by determining a gradation conversion curve such that the luminance values around the peak of the histogram can be distributed to as many gradation levels as possible, it avoids deterioration of contrast regarding an important subject imaged. As this technology, the techniques with which the output luminance is uniformly determined for the luminance of an input image are called "global tone compression methods".

However, with the global tone compression method, regarding changes in luminance where differential values in the gradation conversion curve are small (luminance at which the range of gradation would be cut off), the changes in luminance would be small. This may result in a problem that the image would be visually unappealing; because its low-amplitude contrast feeling and solidity of the subject (these properties may be collectively-referred to as textures or details) would be lost.

In turn, there has been a tone compression method which might solve the problem with the visual quality in the global tone compression method; that is, a local tone compression method. This method uses the findings that a large dynamic range image may usually be generated by lighting with strong contrast rather than by the contrast of the subject itself. Accordingly, this method includes performing the tone compression only on the component of the lighting, so that the dynamic range would be narrowed.

Such methods are called "local tone compression methods" in contrast with the global tone compression methods, because the output luminance is not uniformly determined for the luminance of an input image in this method, and the relation between the input and output luminance may vary pixel by pixel.

For example, Japanese Patent Application Laid-open No. 2004-221644 discloses a technology of using a local tone compression method, by subjecting an image to tone compression using a global tone compression method and then compensating the image for components other than the component of the lighting. This technology uses the property of distribution of lighting usually being spatially smooth in areas other than edge parts. Thus, this technology includes band-separating the image at low pass filter, to treat the image components of the low-frequency side as the component of the lighting.

SUMMARY

Meanwhile, with such tone compression methods, in the past, in cases where the gradation conversion curve is not set appropriately, maximum value of an input signal level might stick to a saturation level, and this would lead to an output of a visually unappealing image which looks as if having its dynamic range narrowed. Consequently, deterioration of image quality would occur, when the tone compression is to be performed.

In view of the above circumstances, it is desirable to make it possible to perform tone compression which is able to prevent deterioration of image quality, with a simple configuration.

According to an embodiment of the present disclosure, there is provided an image processing apparatus including a comparing unit, a tone curve generator and a luminance gradation compression processor. The comparing unit is configured to perform comparison using at least one of a maximum value and an average value of luminance signals of an input image, with a saturation level as a reference of comparison, the saturation level being a level of light accumulation performed for a predetermined time length, the predetermined time length being one out of a plurality of time lengths for accumulating light in imaging of the input image. The tone curve generator is configured to generate a tone curve to be used for performing compression processing to luminance gradation of the input image, on the basis of a result of comparison made by the comparing unit. The luminance gradation compression processor is configured to perform compression processing to luminance gradation of the input image, according to the tone curve being generated by the tone curve generator.

According to some embodiments of the present disclosure, there are provided an image processing method and a program including: performing comparison using at least one of a maximum value and an average value of luminance signals of an input image, with a saturation level as a reference of comparison, the saturation level being a level of light accumulation performed for a predetermined time length, the predetermined time length being one out of a plurality of time lengths for accumulating light in imaging of the input image; generating a tone curve to be used for performing compression processing to luminance gradation of the input image, on the basis of a result of comparison being made; and performing compression processing to luminance gradation of the input image, according to the tone curve being generated.

According to an embodiment of the present disclosure, there is provided an electronic apparatus including an image processing apparatus. The image processing apparatus has a comparing unit, a tone curve generator and a luminance gradation compression processor. The comparing unit is configured to perform comparison using at least one of a maximum value and an average value of luminance signals of an input image, with a saturation level as a reference of comparison, the saturation level being a level of light accumulation performed for a predetermined time length, the predetermined time length being one out of a plurality of time lengths for accumulating light in imaging of the input image. The tone curve generator is configured to generate a tone curve to be used for performing compression processing to luminance gradation of the input image, on the basis of a result of comparison made by the comparing unit. The luminance gradation compression processor is configured to perform compression processing to luminance gradation of the input image, according to the tone curve being generated by the tone curve generator.

According to an embodiment of the present disclosure, comparison is performed using at least one of a maximum value and an average value of luminance signals of an input image, with a saturation level as a reference of comparison, the saturation level being a level of light accumulation performed for a predetermined time length, the predetermined time length being one out of a plurality of time lengths for accumulating light in imaging of the input image. A tone curve to be used for performing compression processing to luminance gradation of the input image is generated, on the basis of a result of the comparison. Compression processing to luminance gradation of the input image is performed according to the tone curve being generated.

According to an embodiment of the present disclosure, it thus becomes possible to perform tone compression which is able to prevent deterioration of image quality, with a simple configuration.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, a concrete embodiment of the disclosure is described with reference to the drawings.

Figure 1:
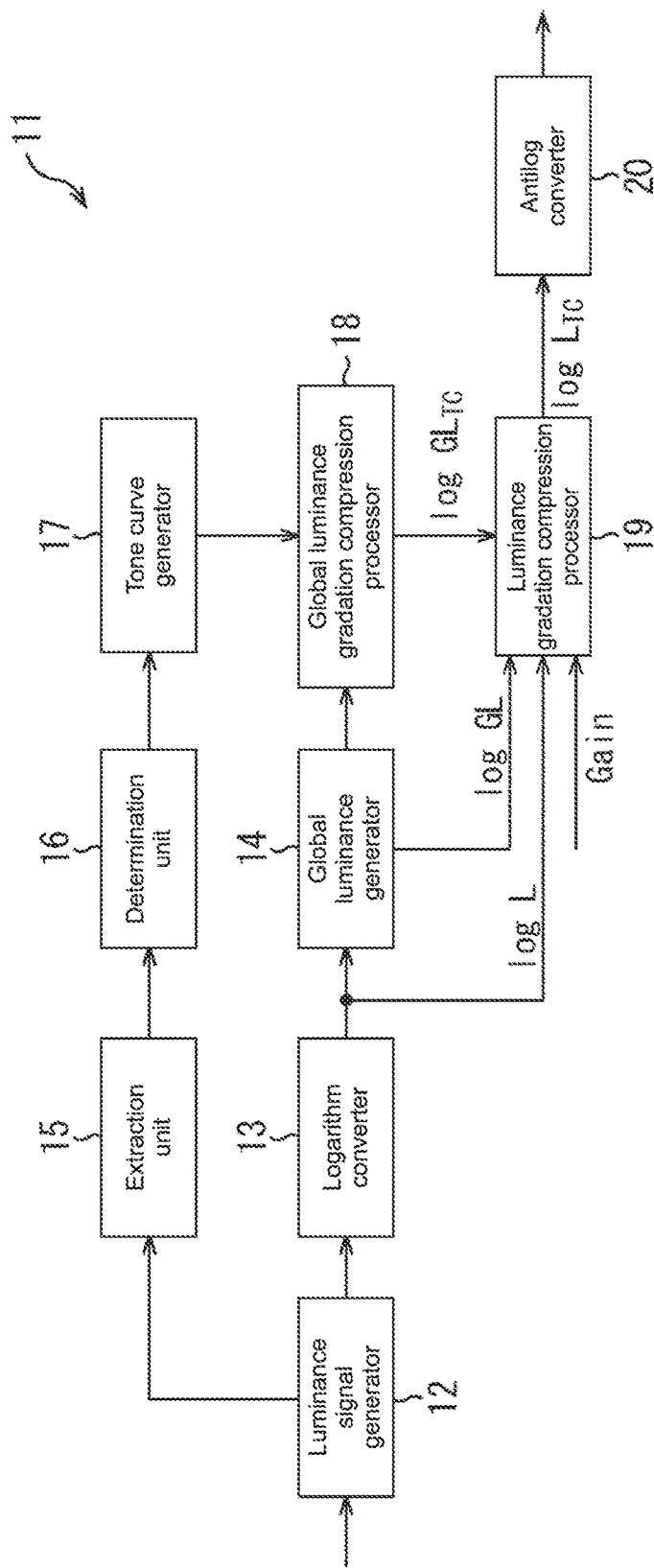
FIG. 1 is a block diagram showing a configuration example of an embodiment of an image processing apparatus to which the present disclosure is applied.

FIG. 1 is a block diagram showing a configuration example of an embodiment of an image processing apparatus to which the present disclosure is applied.

As shown in FIG. 1, an image processing apparatus 11 includes a luminance signal generator 12, a logarithm converter 13, a global luminance generator 14, an extraction unit 15, a determination unit 16, a tone curve generator 17, a global luminance gradation compression processor 18, a luminance gradation compression processor 19 and an anti-log converter 20.

To the luminance signal generator 12, for example, an image taken by a solid state image sensor (not shown) is input. The luminance signal generator 12 generates luminance signals L, from image signals making up this image (hereinafter, the image will be referred to as "input image"). The luminance signal generator 12 provides the luminance signals L to the logarithm converter 13 and to the extraction unit 15.

The logarithm converter 13 determines a luminance logarithm value logL by performing logarithm conversion on the luminance signal L of the input image being provided from the luminance signal generator 12. The logarithm converter 13 provides the luminance logarithm value logL to the global luminance generator 14 and to the luminance gradation compression processor 19.

The global luminance generator 14 may be a low pass filter (LPF) that cuts off components having frequencies lower than a predetermined frequency. The global luminance generator 14 subjects the luminance logarithm value logL to low pass filtering, the luminance logarithm value logL being provided from the logarithm converter 13. In this way, the global luminance generator 14 generates image components of the low-frequency side being divided into bands, as a global luminance logarithm value logGL. The global luminance generator 14 provides the global luminance logarithm value logGL to the global luminance gradation compression processor 18 and to the luminance gradation compression processor 19.

The extraction unit 15 extracts a minimum value "min", maximum value "max" and an average value "ave" from the luminance signals L of the input image being provided from the luminance signal generator 12; and provides these values to the determination unit 16.

The determination unit 16 performs determination using one of the maximum value "max" and the average value "ave" of the luminance signals L of the input image. For example, the determination unit 16 may perform the determination based on a result of comparison obtained by comparing: the maximum value "max", the average value "ave", or the average of the "max" and "ave", of the luminance signals L of the input image; with a value based on a saturation level of a long-time accumulation or a saturation level of a short-time accumulation, as a reference, the saturation level being a level of light accumulation performed for a plurality of time lengths in performing imaging of the input image. Note that the determination to be performed by the determination unit 16 will be described later with reference to the flowcharts of FIGS. 8 and 14.

The tone curve generator 17 generates a tone curve to be used for performing tone compression to the luminance signals of the input image, according to the determination made by the determination unit 16. The tone curve generator 17 provides the tone curve to the global luminance gradation compression processor 18.

The global luminance gradation compression processor 18 performs tone compression to the global luminance logarithm value logGL being provided from the global luminance generator 14, using the tone curve being generated by the tone curve generator 17. Then the global luminance gradation compression processor 18 provides the tone-compressed global luminance logarithm value logGL$_{TC}$ being obtained by the tone compression, to the luminance gradation compression processor 19.

The luminance gradation compression processor 19 performs luminance gradation compression processing according to the following formulae (1) and (2), using an externally provided amplification factor "Gain", to subject the tone-compressed global luminance logarithm value logGL$_{TC}$ to tone compression, the tone-compressed global luminance logarithm value logGL$_{TC}$ being provided from the global luminance gradation compression processor 18. Then the global luminance gradation compression processor 18 provides a tone-compressed luminance logarithm value logL$_{TC}$ being determined by the luminance gradation compression processing, to the antilog converter 20.

[Formula 1]

$$logL_c = logL - logGL \quad (1)$$

$$logL_{TC} = logGL_{TC} + (logL_c \times Gain) \quad (2)$$

The antilog converter 20 performs antilogarithmic conversion to the tone-compressed luminance logarithm value logL$_{TC}$ being provided from the luminance gradation compression processor 19, and outputs a tone-compressed luminance L$_{TC}$.

With the image processing apparatus 11 thus configured, by generating the tone curve according to the result of determination made by the determination unit 16, for example, it becomes possible to avoid such a case where the maximum value "max" of the luminance signals L of the input image sticks to the saturation level. It thus becomes possible to avoid such a case where the image becomes visually unappealing as if its dynamic range is narrowed by the tone compression, and it can prevent an occurrence of such deterioration of image quality.

Figure 2:
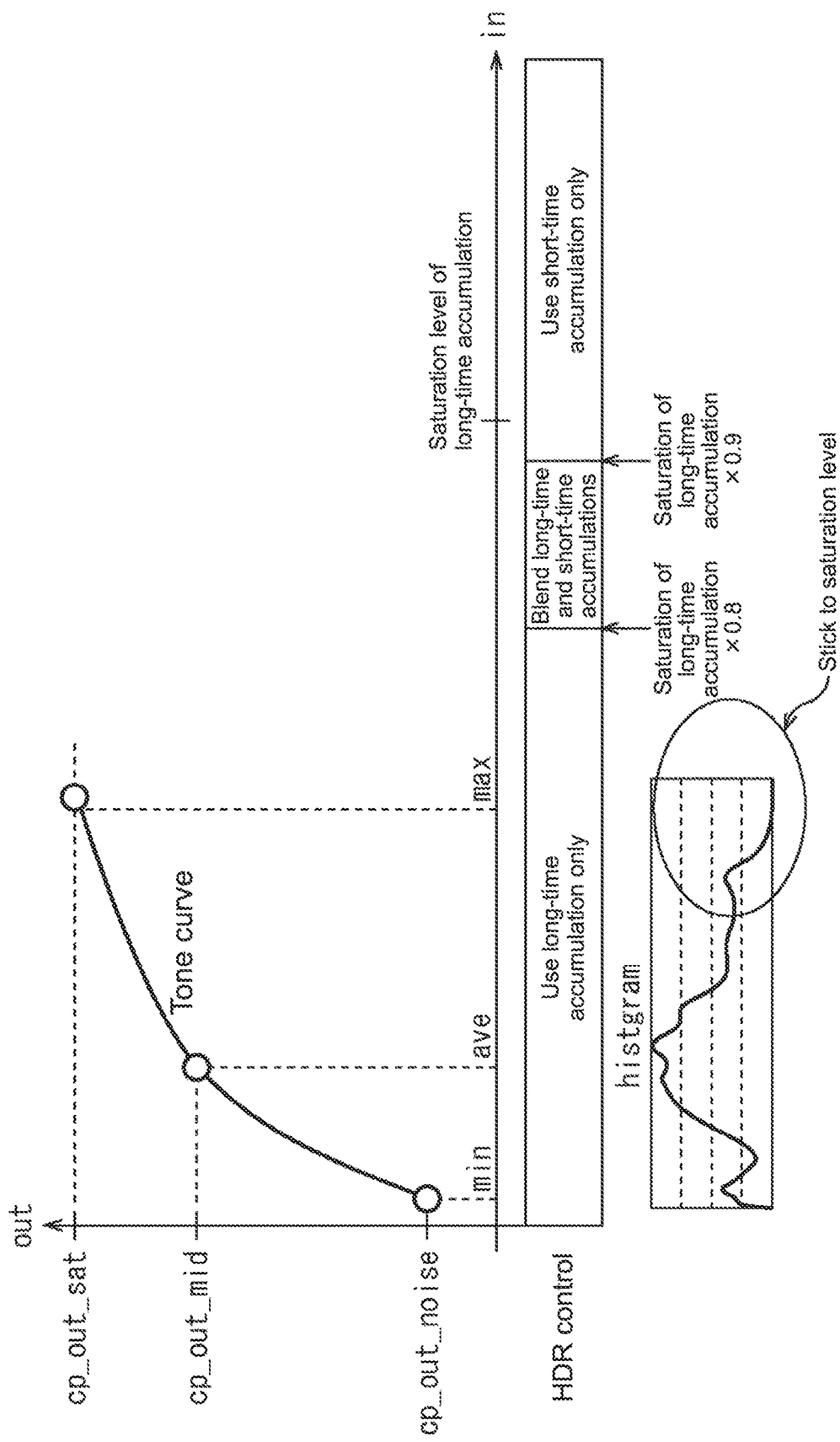
FIG. 2 is a figure describing a tone curve used for luminance gradation compression in the past.

Now, with reference to FIG. 2, a tone curve (gradation conversion curve) used for luminance gradation compression in the past will be described.

Figure 12:
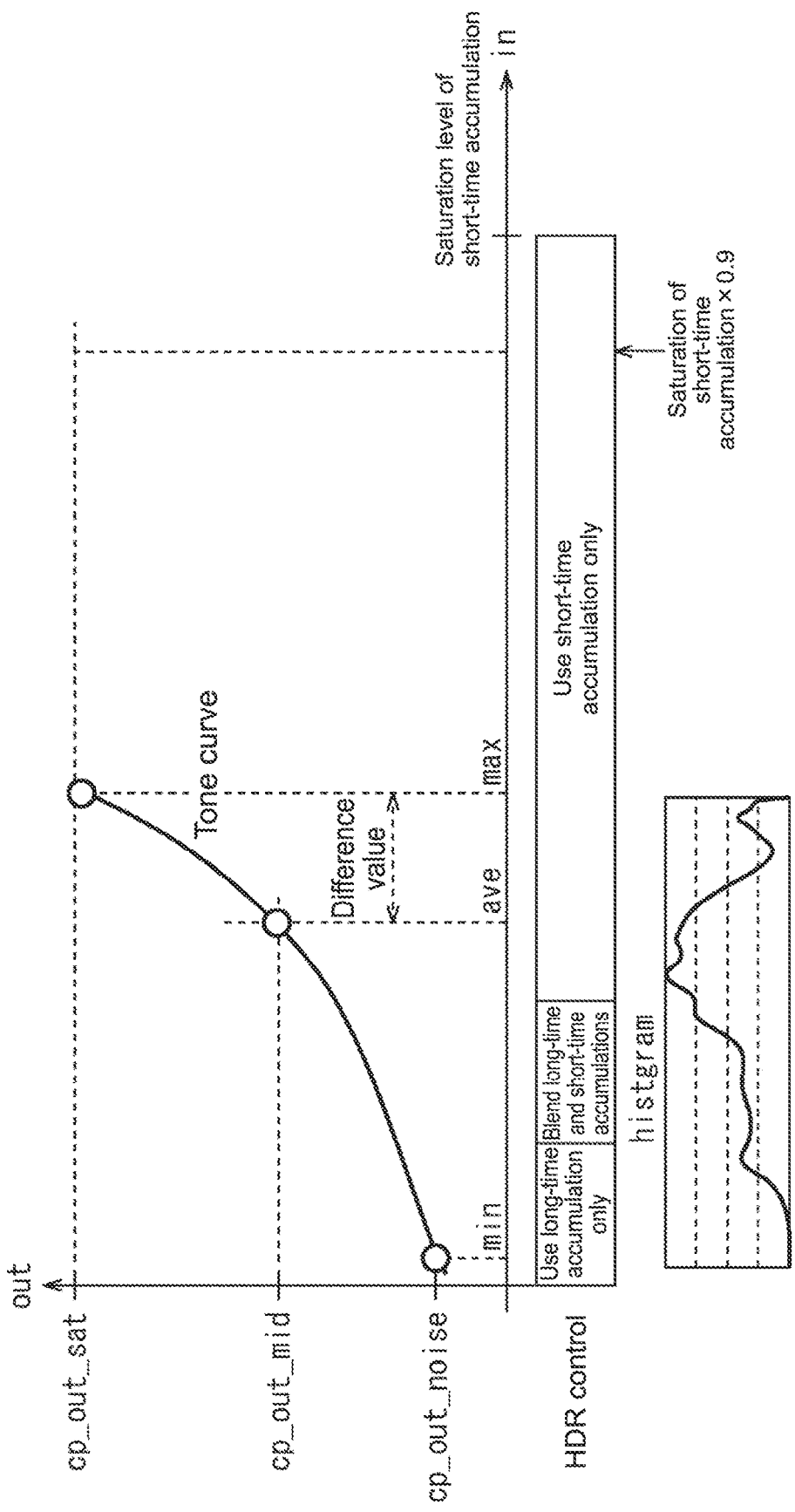
FIG. 12 is a figure describing a tone curve used for luminance gradation compression in the past.

Typically, an output noise value "cp_out_noise" is set corresponding to the minimum value "min" of the luminance signals L of the input image; and an output saturation value "cp_out_sat" is set corresponding to the maximum value "max" of the luminance signals L of the input image. Further, an output median value "cp_out_mid" is set corresponding to the average value "ave" of the luminance signals L of the input image is set, and thus the tone curve passing these three points as shown in FIG. 12 is generated. With the use of this tone curve, the luminance gradation compression is performed.

For example, if the value set as the output noise value "cp_out_noise" is too high, the noise may be too strong; so the output noise value "cp_out_noise" is set to a low level that the noise becomes hardly noticeable. Besides, in order to effectively make use of an output range, it has been common to set the output saturation value "cp_out_sat" to the saturation level. By further setting the output median value "cp_out_mid" to an appropriate level, the tone curve corresponding to a scene can be generated.

However, with the tone curve having the output saturation value "cp_out_sat" being set to the saturation level, there is a possibility that the maximum value "max" of the luminance signals L of the input image would stick to the saturation level, in a scene where the minimum value "min" and the maximum value "max" of the luminance signals L of the input image fall within a single shutter. Due to this, as a result of the luminance gradation compression being performed, the image might become visually unappealing as if its dynamic range is narrowed by the tone compression. For example, in FIG. 2, there is shown a case in which the minimum value "min" and the maximum value "max" of the luminance signals L of the input image fall within a range of the long-time accumulation only.

As used herein, the term "long-time accumulation" means that of a long-time accumulation and a short-time accumulation in imaging an image for performing HDR (High Dynamic Range) synthesis. That is, in the HDR synthesis, by accumulating light for different time lengths, which are the time lengths for the long-time accumulation and the short-time accumulation, in imaging the image, and then by synthesizing (blending) the image resulting from the long-time accumulation and the image resulting from the short-time accumulation, the image having a wide dynamic range would be synthesized. With the image processing apparatus 11, when the image to be HDR synthesized is imaged; if the minimum value "min" and the maximum value "max" of the luminance signals L of the input image fall within the range of the long-time accumulation only, determination based on the long-time accumulation would then be performed.

At this time, with the image processing apparatus 11 of FIG. 1, for the scene where the minimum value "min" and the maximum value "max" of the luminance signals L of the input image fall within a single shutter, luminance gradation compression would be performed, and this luminance gradation compression would be able to avoid such a case where the image becomes visually unappealing as if its dynamic range is narrowed. For example, with the image processing apparatus 11, in cases where the maximum value "max" of the luminance signals L of the input image is equal to or lower than a certain level based on the saturation level of the long-time accumulation as a reference, the maximum value "max" of the luminance signals L of the input image would be replaced with this certain level, and by using the resulting value, the tone curve would be generated.

Specifically, in the image processing apparatus 11, the determination unit 16 compares the maximum value "max" of the luminance signals L of the input image and a value 0.8 times the saturation level of the long-time accumulation. Then, if the determination unit 16 has determined that the maximum value "max" of luminance signals L of the input image was equal to or less than 0.8 times the saturation level of the long-time accumulation, the maximum value "max" of the luminance signals L of the input image would be replaced with the value 0.8 times the saturation level of the long-time accumulation; and the tone curve would be generated.

Figure 3:
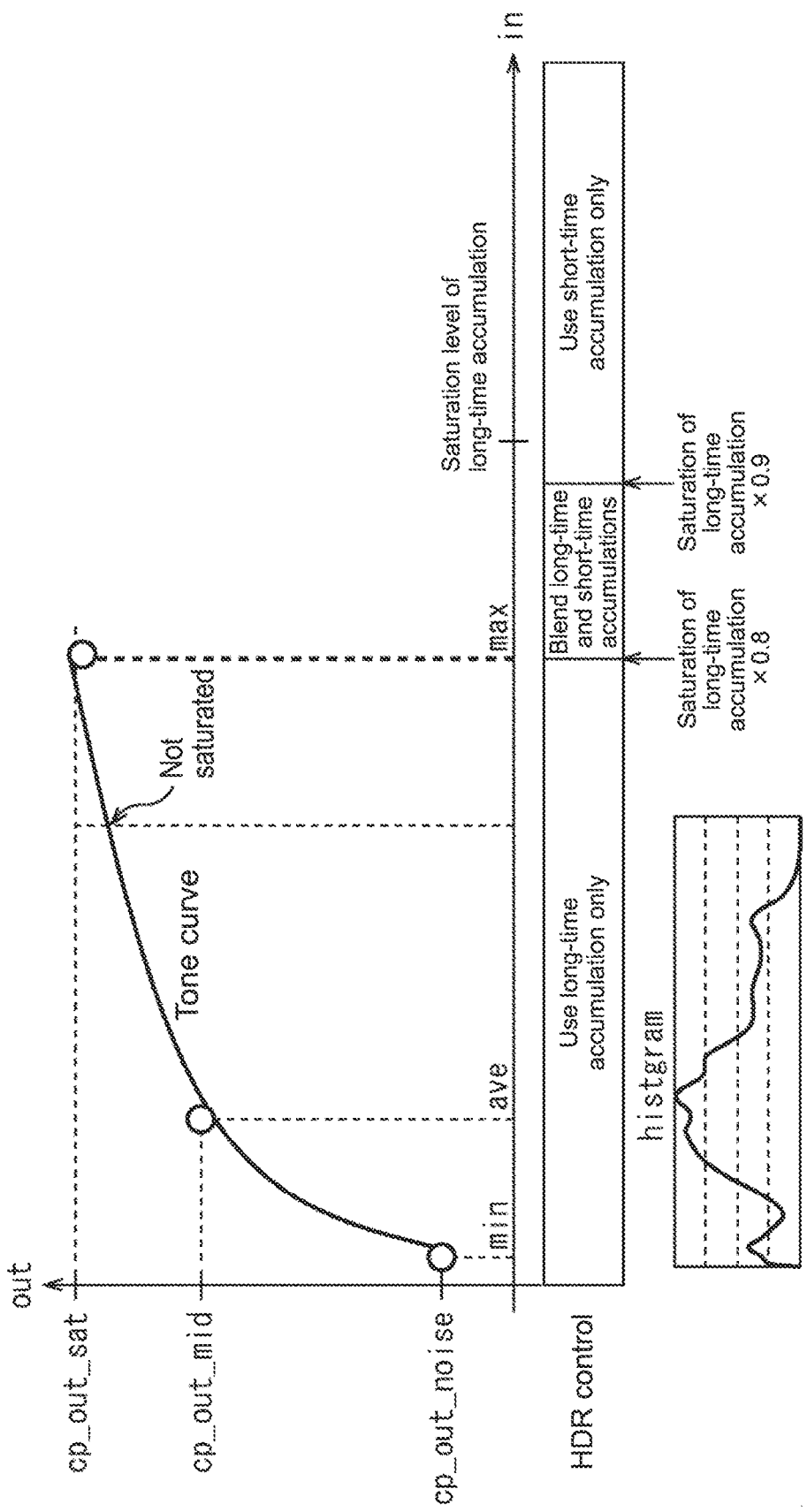
FIG. 3 is a figure describing a tone curve generated based on determination using a saturation level of long-time accumulation as a reference.

FIG. 3 shows a tone curve generated by replacing the maximum value "max" of the luminance signals L of the input image with the value 0.8 times the saturation level of the long-time accumulation. Then, by performing luminance gradation compression using this tone curve by the global luminance gradation compression processor 18, it becomes possible to avoid such a case where the maximum value "max" of the luminance signals L of the input image would stick to the saturation level. Therefore, even in a scene where the minimum value "min" and the maximum value "max" of the luminance signals L of the input image fall within a single shutter, it is possible to avoid such a case where the image resulting from performing luminance gradation compression becomes visually unappealing as if its dynamic range is narrowed.

Note that the determination unit 16 may perform any determination that is based on the saturation level of the long-time accumulation as a reference. For example, it may be possible to perform determination using, as a reference, a value of a certain ratio (0.8 times in the above-described example) to the saturation level of the long-time accumulation; or perform determination using, as a reference, a certain offset from the saturation level of the long-time accumulation. In addition, the determination unit 16 may perform determination using, as a reference, a value calculated from the certain ratio and the certain offset for the saturation level of the long-time accumulation as well.

Figure 4:
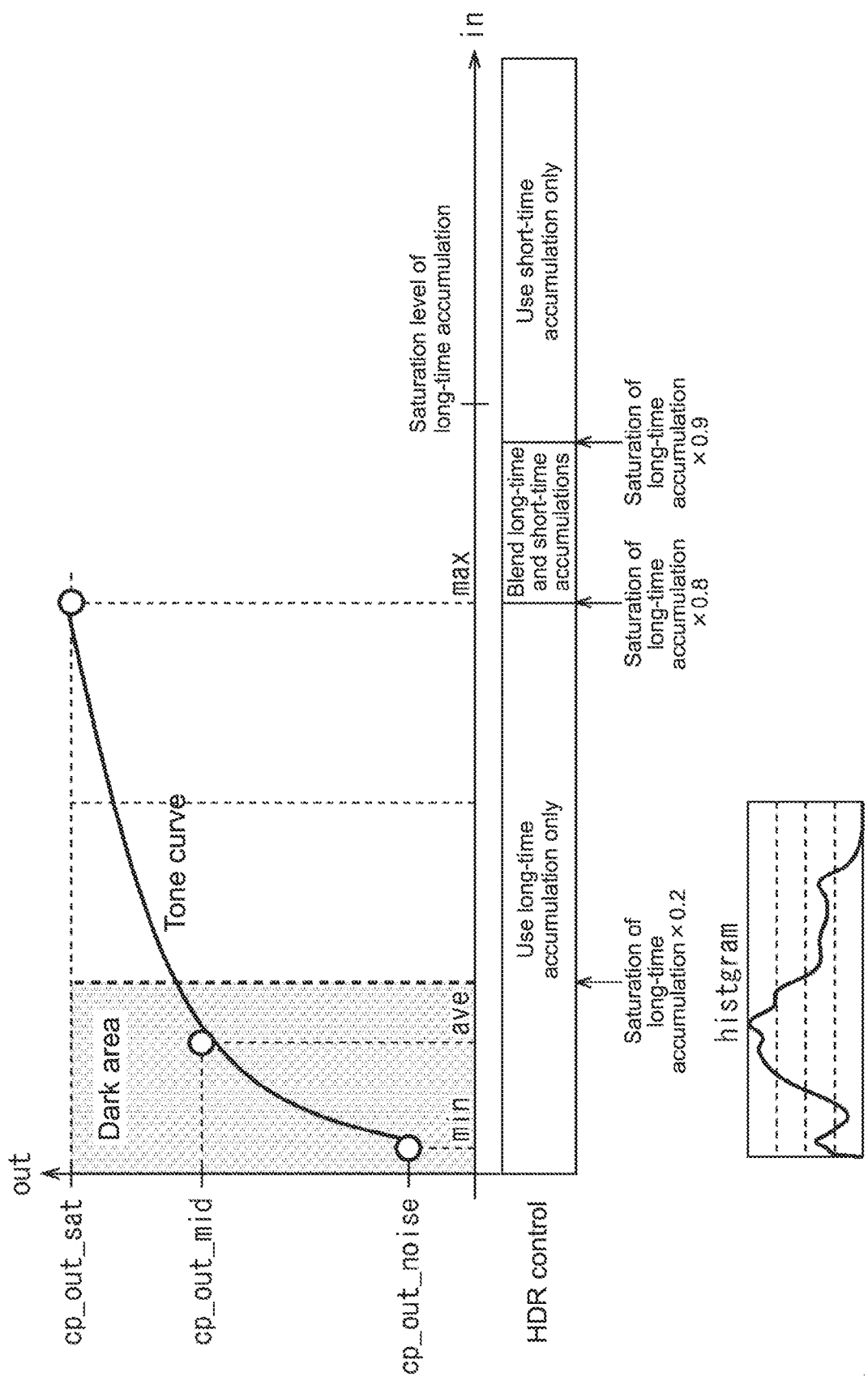
FIG. 4 is a figure describing a tone curve used for luminance gradation compression in the past.

Incidentally, as shown in FIG. 4, in a tone compression method in the past, for dark scenes where the average value "ave" of the luminance signals L of the input image becomes lower than a certain level, a tone curve which may raise an output level of the output median value "cp_out_mid" has been used for tone compression. Accordingly, as a result of the tone compression being performed in such a manner that the dark input signals would be raised, there have been some cases where noises in the image become noticeable.

In view of this, with the image processing apparatus 11 of FIG. 1, for a dark scene where the average value "ave" of the luminance signals L of the input image becomes lower than a certain level, luminance gradation compression would be performed, and this luminance gradation compression would be able to avoid such a case where noises in the image become noticeable. For example, with the image processing apparatus 11, in cases where the average value "ave" of the luminance signals L of the input image is equal to or lower than a certain level based on the saturation level of the long-time accumulation as a reference, a linear output would be made; that is, a tone curve in a linear fashion would be generated.

Specifically, in the image processing apparatus 11, the determination unit 16 compares the average value "ave" of the luminance signals L of the input image and a value 0.2 times the saturation level of the long-time accumulation. Then, if the determination unit 16 has determined that the average value "ave" of luminance signals L of the input image was equal to or less than 0.2 times the saturation level of the long-time accumulation, the tone curve in a linear fashion would be generated.

Figure 5:
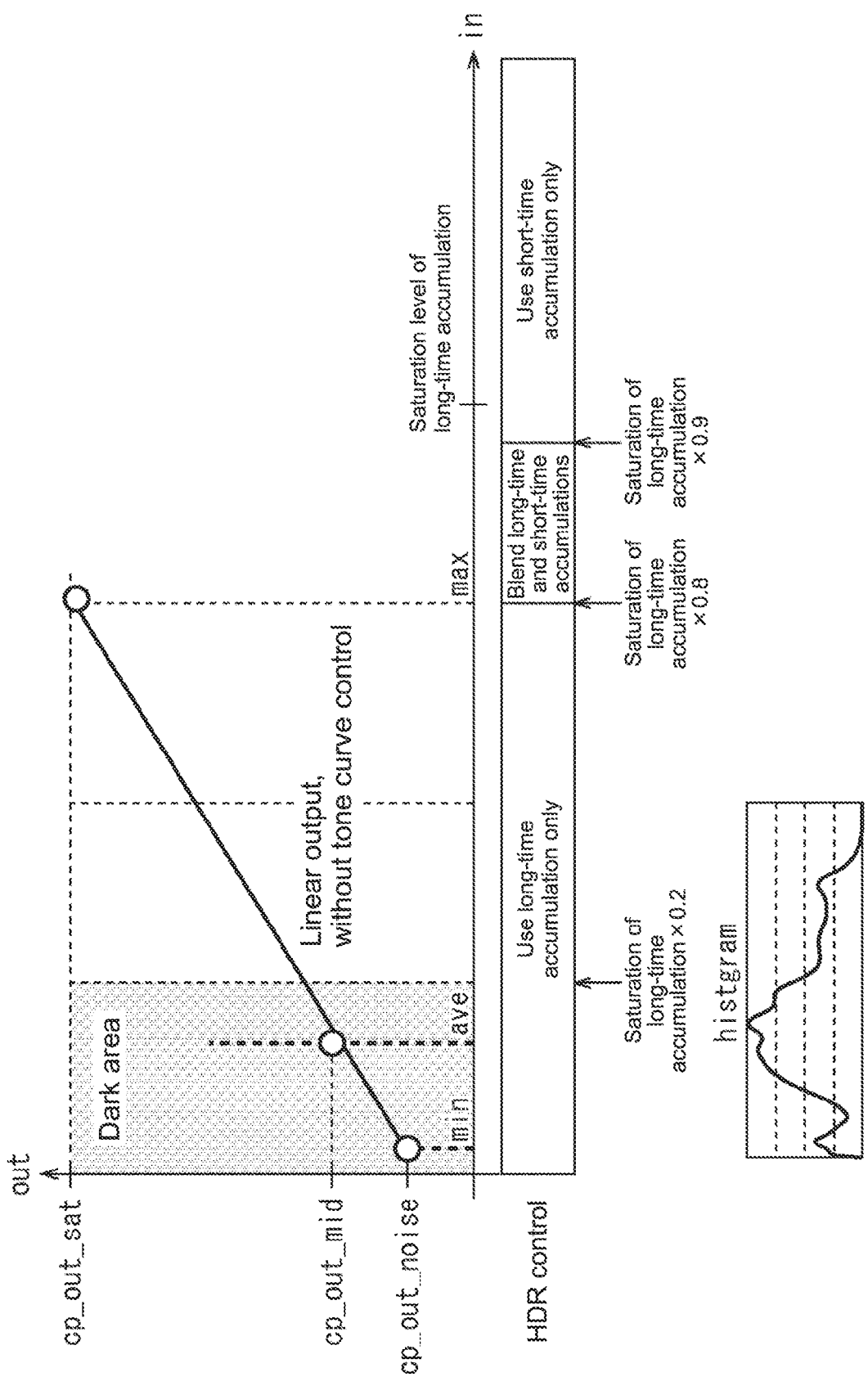
FIG. 5 is a diagram describing a linear tone curve used for a dark scene.

FIG. 5 shows a tone curve generated in such a manner that the maximum value "max" and the minimum value "min" of the luminance signals L of the input image are linearly connected. Then, by performing luminance gradation compression using this tone curve by the global luminance gradation compression processor 18, it becomes possible to avoid such a case where the tone compression would be performed in such a manner that the dark input signals are raised. Therefore, even in a dark scene where the average value "ave" of the luminance signals L of the input image becomes lower than a certain level, it is possible to avoid such a case where the noises in the image resulting from performing luminance gradation compression become noticeable.

Note that the determination unit 16 may perform any determination that is based on the saturation level of the long-time accumulation as a reference. For example, it may be possible to perform determination using, as a reference, a value of a certain ratio (0.2 times in the above-described example) to the saturation level of the long-time accumulation; or perform determination using, as a reference, a certain offset from the saturation level of the long-time accumulation. In addition, the determination unit 16 may perform determination using, as a reference, a value calculated from the certain ratio and the certain offset for the saturation level of the long-time accumulation as well.

Figure 6:
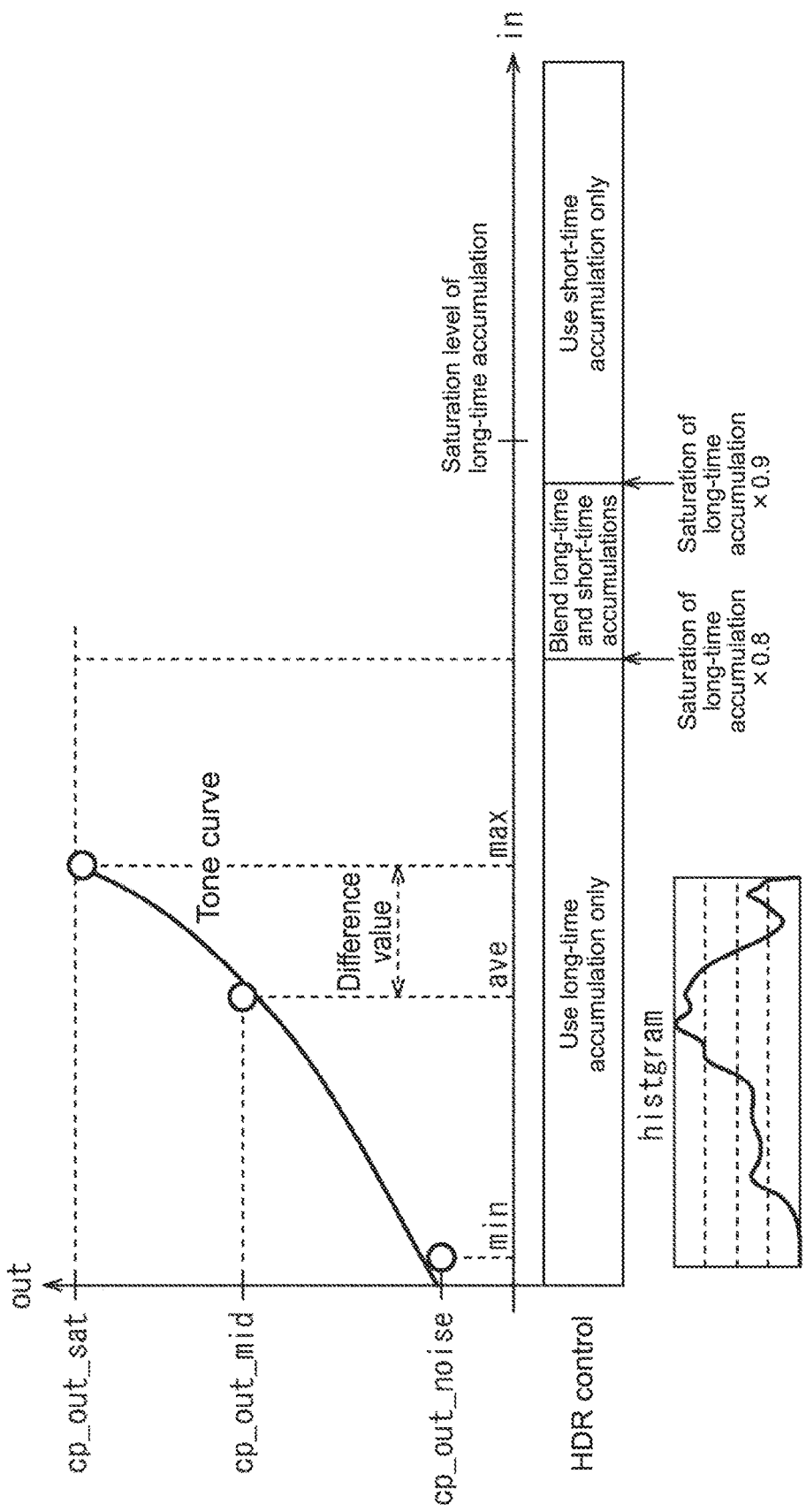
FIG. 6 is a figure describing a tone curve used for luminance gradation compression in the past.

On the other hand, as shown in FIG. 6, in a tone compression method in the past, for a scene in which the input image is almost all white as in cases where an image of a white wall is taken, for example, a contrast of light and dark appearing on the white wall, by the matters such as lens shading, may be relatively strong due to the tone curve. Accordingly, as a result of the tone compression being performed, the image might have relatively strong lens shading or the like, which would lead to deterioration of image quality.

In view of this, with the image processing apparatus 11 of FIG. 1, for a scene in which the input image is almost all white as in cases where an image of a white wall is taken, luminance gradation compression would be performed, and this luminance gradation compression would be able to avoid such a case where the image has relatively strong lens shading or the like and would lead to deterioration of image quality. For example, with the image processing apparatus 11, in cases where a difference value between the maximum value "max" and the average value "ave" of the luminance signals L of the input image is equal to or lower than a certain level based on the saturation level of the long-time accumulation as a reference, a linear output would be made; that is, a tone curve in a linear fashion would be generated.

Specifically, in the image processing apparatus 11, the determination unit 16 compares the difference value between the maximum value "max" and the average value "ave" of the luminance signals L of the input image and a value 0.2 times the saturation level of the long-time accumulation. Then, if the determination unit 16 has determined that the difference value between the maximum value "max" and the average value "ave" of the luminance signals L of the input image was equal to or less than 0.2 times the saturation level of the long-time accumulation, the tone curve in a linear fashion would be generated.

Figure 7:
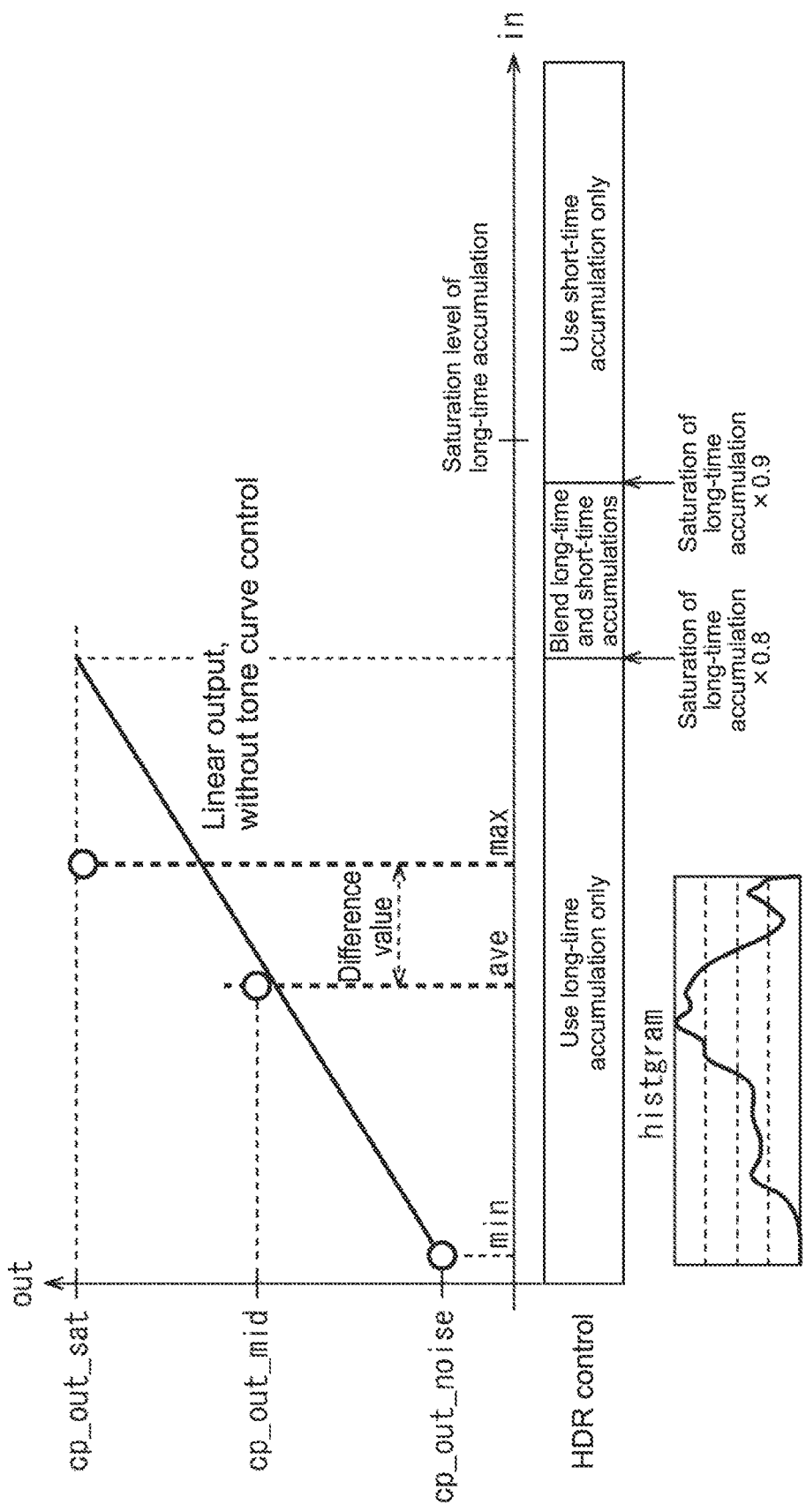
FIG. 7 is a diagram describing a linear tone curve used for a scene which is almost all white.

FIG. 7 shows a tone curve generated in such a manner that a certain value and the minimum value "min" of the luminance signals L of the input image are linearly connected. The certain value is a value of a certain ratio (e.g., 0.8 times) to the saturation level of the long-time accumulation, with which the maximum value "max" has been replaced. By performing luminance gradation compression using this tone curve by the global luminance gradation compression processor 18, it becomes possible to avoid such a case where the tone compression would be performed in such a manner that the image has relatively strong lens shading or the like. Therefore, even in a scene in which the input image is almost all white as in cases where an image of a white wall is taken, it is possible to avoid such a case where the deterioration of image quality occurs in the image resulting from performing luminance gradation compression.

Figure 8:
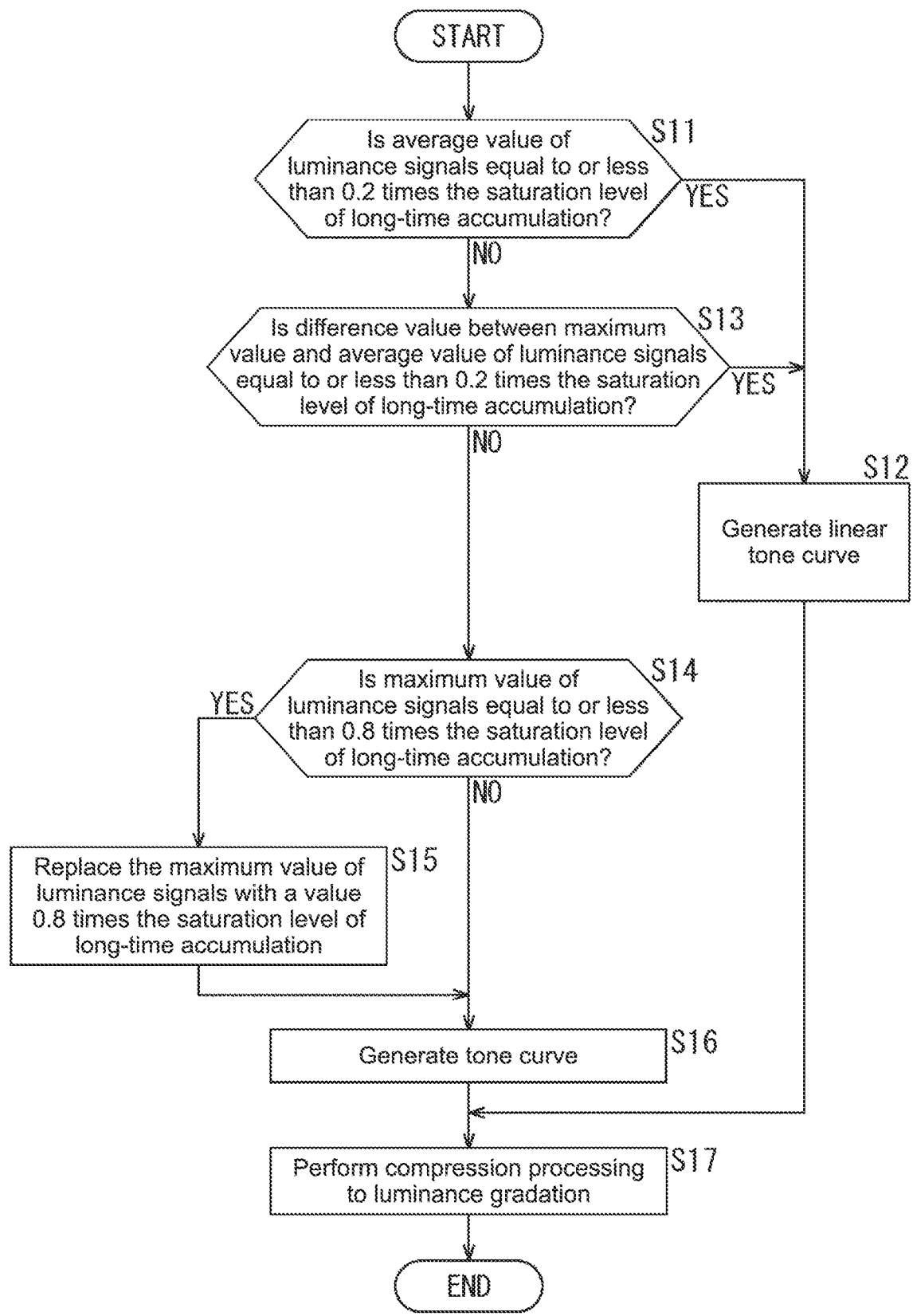
FIG. 8 is a flowchart describing determination performed by a determination unit.

Next, with reference to the flowchart of FIG. 8, determination performed by the determination unit 16 will be described.

For example, when the minimum value "min", the maximum value "max" and the average value "ave" of the luminance signals L of the input image are provided from the extraction unit 15 to the determination unit 16, the processing would be started.

In step S11, the determination unit 16 determines whether or not the average value "ave" of the luminance signals L of the input image is equal to or less than 0.2 times the saturation level of the long-time accumulation.

If the determination unit 16 determines in step S11 that the average value "ave" of the luminance signals L of the input image is equal to or less than 0.2 times the saturation level of the long-time accumulation, the process goes on to step S12. In step S12, the determination unit 16 instructs the tone curve generator 17 to make a linear output, and provides the tone curve generator 17 with the minimum value "min", the maximum value "max" and the average value "ave" of the luminance signals L of the input image. Following this instruction, the tone curve generator 17 generates a linear tone curve such that the maximum value "max" and the minimum value "min" of the luminance signals L of the input image are linearly connected; and provides this tone curve to the global luminance gradation compression processor 18. In such a way, for example, as described above with reference to FIG. 5, even if the luminance gradation compression is to be performed for a dark scene where the average value "ave" of the luminance signals L of the input image becomes lower than a certain level, it would be able to avoid such a case where noises in the image become noticeable.

Besides, if the determination unit 16 determines in step S11 that the average value "ave" of the luminance signals L of the input image is not equal to or less than 0.2 times the saturation level of the long-time accumulation (greater than 0.2 times the saturation level), the process goes on to step S13.

In step S13, the determination unit 16 determines whether or not the difference value between the average value "ave" and the maximum value "max" of the luminance signals L of the input image is equal to or less than 0.2 times the saturation level of the long-time accumulation.

If the determination unit 16 determines in step S13 that the difference value between the average value "ave" and the maximum value "max" of the luminance signals L of the input image is equal to or less than 0.2 times the saturation level of the long-time accumulation, the process goes on to step S12; and the process as described above is performed. In such a way, for example, as described above with reference to FIG. 7, even if the luminance gradation compression is to be performed for a scene in which the input image is almost all white as in cases where an image of a white wall is taken, it would be able to avoid such a case where the deterioration of image quality occurs in the image, such as having relatively strong lens shading.

Besides, if the determination unit 16 determines in step S13 that the difference value between the average value "ave" and the maximum value "max" of the luminance signals L of the input image is not equal to or less than 0.2 times the saturation level of the long-time accumulation (greater than 0.2 times the saturation level), the process goes on to step S14.

In step S14, the determination unit 16 determines whether or not the maximum value "max" of the luminance signals L of the input image is equal to or less than 0.8 times the saturation level of the long-time accumulation.

If the determination unit 16 determines in step S14 that the maximum value "max" of the luminance signals L of the input image is equal to or less than 0.8 times the saturation level of the long-time accumulation, the process goes on to step S15. In step S15, the determination unit 16 replaces the maximum value "max" of the luminance signals L of the input image with a value 0.8 times the saturation level of the long-time accumulation; provides this value to the tone curve generator 17; and also provides the minimum value "min" and the average value "ave" of the luminance signals L of the input image to the tone curve generator 17.

After the process of step S15, the process goes on to step S16; and the tone curve generator 17 generates a tone curve. In this case, as described above with reference to FIG. 3, the tone curve generator 17 generates a tone curve in which the maximum value "max" of the luminance signals L of the input image has been replaced with the value 0.8 times the saturation level of the long-time accumulation. Thus, even if the luminance gradation compression is to be performed for a scene in which the minimum value "min" and the maximum value "max" of the luminance signals L of the input image fall within a single shutter (long-time accumulation only), it is possible to avoid such a case where the image becomes visually unappealing as if its dynamic range is narrowed.

On the other hand, if the determination unit 16 determines in step S14 that the maximum value "max" of the luminance signals L of the input image is not equal to or less than 0.8 times the saturation level of the long-time accumulation (greater than 0.8 times the saturation level), the process goes on to step S16. In this case, the determination unit 16 provides the tone curve generator 17 with the minimum value "min", the maximum value "max" and the average value "ave" of the luminance signals L of the input image. The tone curve generator 17 generates a tone curve as in a usual process.

After the process of step S12 or step S16, the process goes on to step S17. In step S17, the global luminance gradation compression processor 18 performs compression processing of the luminance gradation to the global luminance logarithm value logGL being provided from the global luminance generator 14, using the tone curve being generated by the tone curve generator 17; and thus the processing ends.

Therefore, as described above, by using the tone curve that is generated according to the determination based on the long-time accumulation as a reference, the image processing apparatus 11 is capable of performing tone compression which is able to prevent deterioration of image quality, with a simple configuration.

That is, for example, the image processing apparatus 11 uses the tone curve that is generated by replacing the maximum value "max" of the luminance signals L of the input image with the value 0.8 times the saturation level of the long-time accumulation, for such a scene that is substantially not a wide dynamic range scene, the scene having the minimum value "min", the maximum value "max" and the average value "ave" all falling within the long-time accumulation only. This allows performing tone compression to this scene, in such a way as to an image having nearly the same level of dynamic range as that of an image being imaged by accumulating light for a single time length (as that of an ordinary image). It thus makes it possible to avoid such a case where the image becomes visually unappealing as if its dynamic range is narrowed.

In addition, for example, the image processing apparatus 11 uses the linear tone curve, for a dark scene where the average value "ave" of the luminance signals L of the input image becomes lower than a certain level, such that the average value "ave" of the luminance signals L of the input image is equal to or less than 0.2 times the saturation level of the long-time accumulation. This makes it possible to avoid such a case where the tone compression would be performed in such a manner that the dark input signals are raised, and thus can suppress the noise in the dark scene.

Furthermore, for example, the image processing apparatus 11 uses the linear tone curve, for a scene in which the input image is almost all white, such that the difference value between the average value "ave" and the maximum value "max" of the luminance signals L of the input image is equal to or less than 0.2 times the saturation level of the long-time accumulation. This makes it possible to avoid such a case where the deterioration of image quality occurs in the image, such as having relatively strong lens shading.

So far, in the above-described embodiment, the processing has been described as that for the scene in which the minimum value "min" and the maximum value "max" of the luminance signals L of the input image fall within the long-time accumulation only. On the other hand, it is also possible to perform the similar processing to a scene in which the minimum value "min" and the maximum value "max" of the luminance signals L of the input image fall within the short-time accumulation only, for example. In other words, the image processing apparatus 11 may be configured not only to generate the tone curve according to the determination based on the long-time accumulation as a reference, but also to generate the tone curve according to the determination based on the short-time accumulation as a reference.

That is, for example, also in a scene where the minimum value "min" and the maximum value "max" of the luminance signals L of the input image fall within the short-time accumulation only, the maximum value "max" of the luminance signals L of the input image would stick to the saturation level. Accordingly, similarly to the case described above with reference to FIG. 2, the image might become visually unappealing as if its dynamic range is narrowed, as a result of the luminance gradation compression being performed.

In view of this, with the image processing apparatus 11 of FIG. 1, for example, in cases where the maximum value "max" of the luminance signals L of the input image is equal to or lower than a certain level based on the saturation level of the short-time accumulation as a reference, the maximum value "max" of the luminance signals L of the input image would be replaced with this certain level, and the tone curve would be generated.

Specifically, in the image processing apparatus 11, the determination unit 16 compares the maximum value "max" of the luminance signals L of the input image and a value 0.9 times the saturation level of the short-time accumulation. Then, if the determination unit 16 has determined that the maximum value "max" of luminance signals L of the input image was equal to or less than 0.9 times the saturation level of the short-time accumulation, the maximum value "max" of the luminance signals L of the input image would be replaced with the value 0.9 times the saturation level of the short-time accumulation; and the tone curve would be generated.

Figure 9:
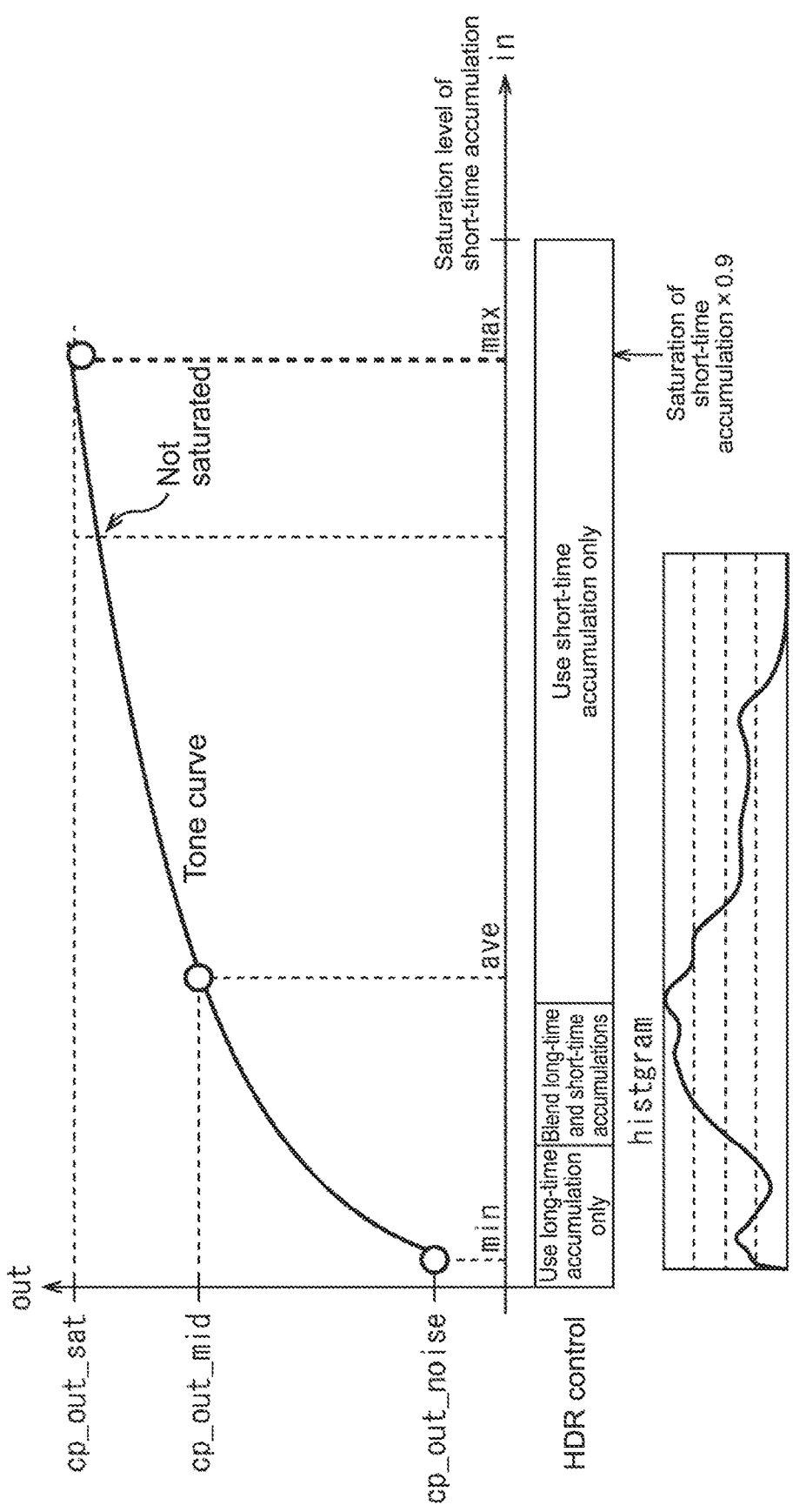
FIG. 9 is a figure describing a tone curve generated based on determination using a saturation level of short-time accumulation as a reference.

FIG. 9 shows a tone curve generated by replacing the maximum value "max" of the luminance signals L of the input image with the value 0.9 times the saturation level of the short-time accumulation. Then, by performing luminance gradation compression using this tone curve by the global luminance gradation compression processor 18, it becomes possible to avoid such a case where the maximum value "max" of the luminance signals L of the input image would stick to the saturation level. Therefore, even in a scene where the minimum value "min" and the maximum value "max" of the luminance signals L of the input image fall within a single shutter, it is possible to avoid such a case where the image resulting from performing luminance gradation compression becomes visually unappealing as if its dynamic range is narrowed.

Note that the determination unit 16 may perform any determination that is based on the saturation level of the short-time accumulation as a reference. For example, it may be possible to perform determination using, as a reference, a value of a certain ratio (0.9 times in the above-described example) to the saturation level of the short-time accumulation; or perform determination using, as a reference, a certain offset from the saturation level of the short-time accumulation. In addition, the determination unit 16 may perform determination using, as a reference, a value calculated from the certain ratio and the certain offset for the saturation level of the short-time accumulation as well.

Figure 10:
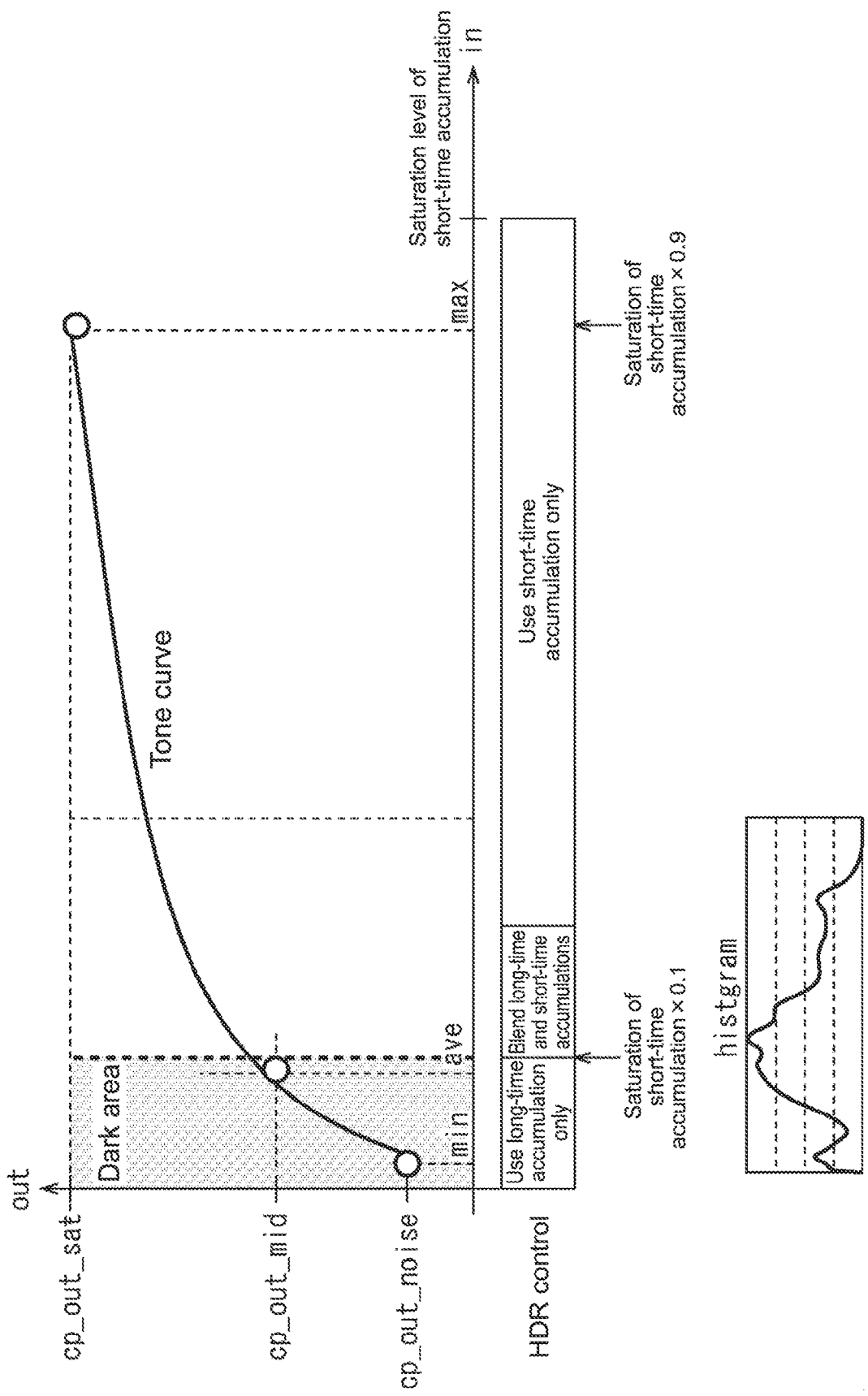
FIG. 10 is a figure describing a tone curve used for luminance gradation compression in the past.

Incidentally, as shown in FIG. 10, in a tone compression method in the past, for dark scenes where the average value "ave" of the luminance signals L of the input image becomes lower than a certain level, a tone curve which may raise an output level of the output median value "cp_out_mid" has been used for tone compression. Accordingly, as a result of the tone compression being performed in such a manner that the dark input signals would be raised, there have been some cases where noises in the image become noticeable.

In view of this, with the image processing apparatus 11 of FIG. 1, for a dark scene where the average value "ave" of the luminance signals L of the input image becomes lower than a certain level, luminance gradation compression would be performed, and this luminance gradation compression would be able to avoid such a case where noises in the image become noticeable. For example, with the image processing apparatus 11, in cases where the average value "ave" of the luminance signals L of the input image is equal to or lower than a certain level based on the saturation level of the short-time accumulation as a reference, a linear output would be made; that is, a tone curve in a linear fashion would be generated.

Specifically, in the image processing apparatus 11, the determination unit 16 compares the average value "ave" of the luminance signals L of the input image and a value 0.1 times the saturation level of the short-time accumulation. Then, if the determination unit 16 has determined that the average value "ave" of luminance signals L of the input image was equal to or less than 0.1 times the saturation level of the short-time accumulation, the tone curve in a linear fashion would be generated.

Figure 11:
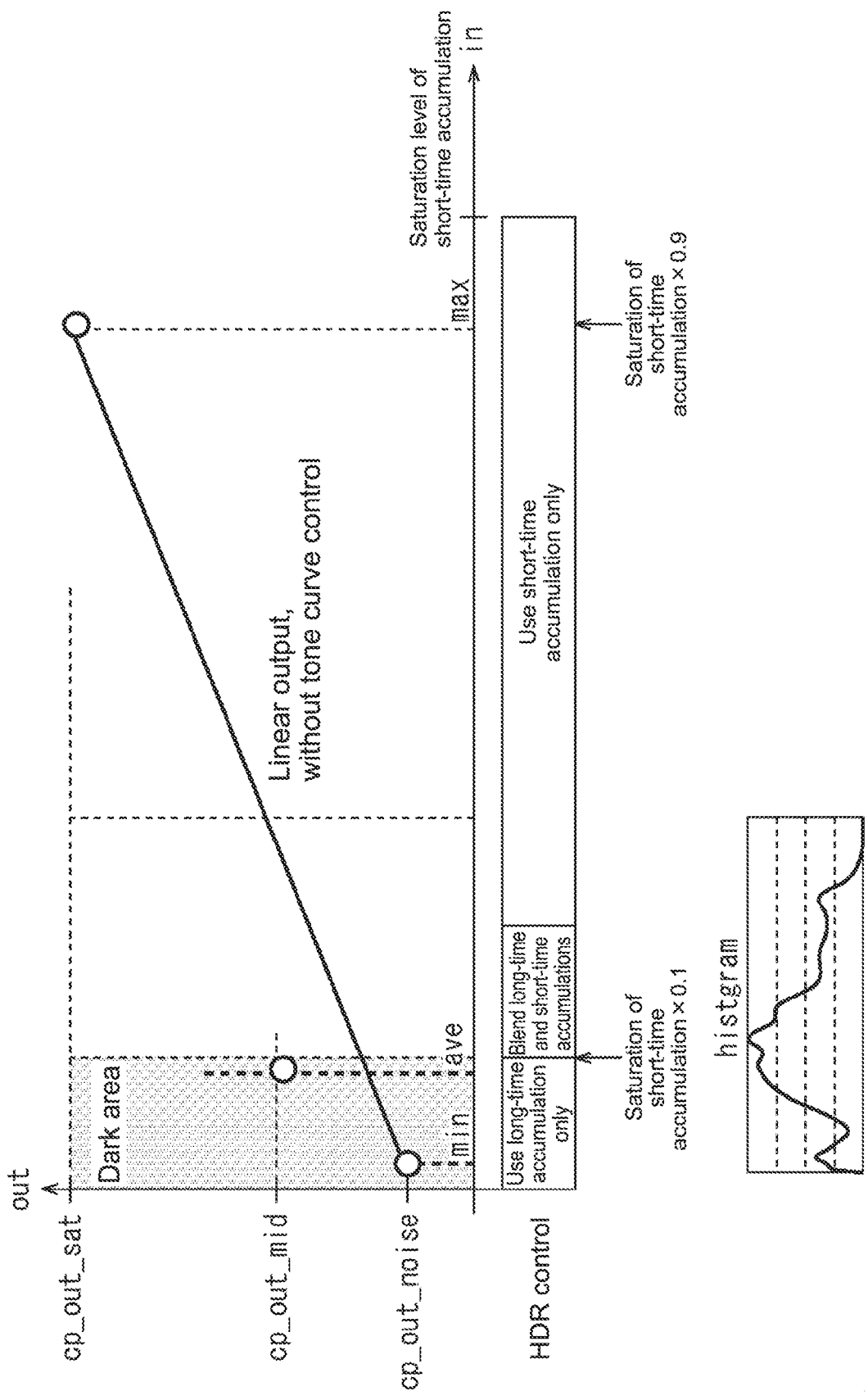
FIG. 11 is a diagram describing a linear tone curve used for a dark scene.

FIG. 11 shows a tone curve generated in such a manner that the maximum value "max" and the minimum value "min" of the luminance signals L of the input image are linearly connected. Then, by performing luminance gradation compression using this tone curve by the global luminance gradation compression processor 18, it becomes possible to avoid such a case where the tone compression would be performed in such a manner that the dark input signals are raised. Therefore, even in a dark scene where the average value "ave" of the luminance signals L of the input image becomes lower than a certain level, it is possible to avoid such a case where the noises in the image resulting from performing luminance gradation compression become noticeable.

Note that the determination unit 16 may perform any determination that is based on the saturation level of the short-time accumulation as a reference. For example, it may be possible to perform determination using, as a reference, a value of a certain ratio (0.1 times in the above-described example) to the saturation level of the short-time accumulation; or perform determination using, as a reference, a certain offset from the saturation level of the short-time accumulation. In addition, the determination unit 16 may perform determination using, as a reference, a value calculated from the certain ratio and the certain offset for the saturation level of the short-time accumulation as well.

On the other hand, as shown in FIG. 12, in a tone compression method in the past, for a scene in which the input image is almost all white as in cases where an image of a white wall is taken, for example, a contrast of light and dark appearing on the white wall, by the matters such as lens shading, may be relatively strong due to the tone curve. Accordingly, as a result of the tone compression being performed, the image might have relatively strong lens shading or the like, which would lead to deterioration of image quality.

In view of this, with the image processing apparatus 11 of FIG. 1, for a scene in which the input image is almost all white as in cases where an image of a white wall is taken, luminance gradation compression would be performed, and this luminance gradation compression would be able to avoid such a case where the image has relatively strong lens shading or the like and would lead to deterioration of image quality. For example, with the image processing apparatus 11, in cases where a difference value between the maximum value "max" and the average value "ave" of the luminance signals L of the input image is equal to or lower than a certain level based on the saturation level of the short-time accumulation as a reference, a linear output would be made; that is, a tone curve in a linear fashion would be generated.

Specifically, in the image processing apparatus 11, the determination unit 16 compares the difference value between the maximum value "max" and the average value "ave" of the luminance signals L of the input image and a value 0.1 times the saturation level of the short-time accumulation. Then, if the determination unit 16 has determined that the difference value between the maximum value "max" and the average value "ave" of the luminance signals L of the input image was equal to or less than 0.1 times the saturation level of the short-time accumulation, the tone curve in a linear fashion would be generated.

Figure 13:
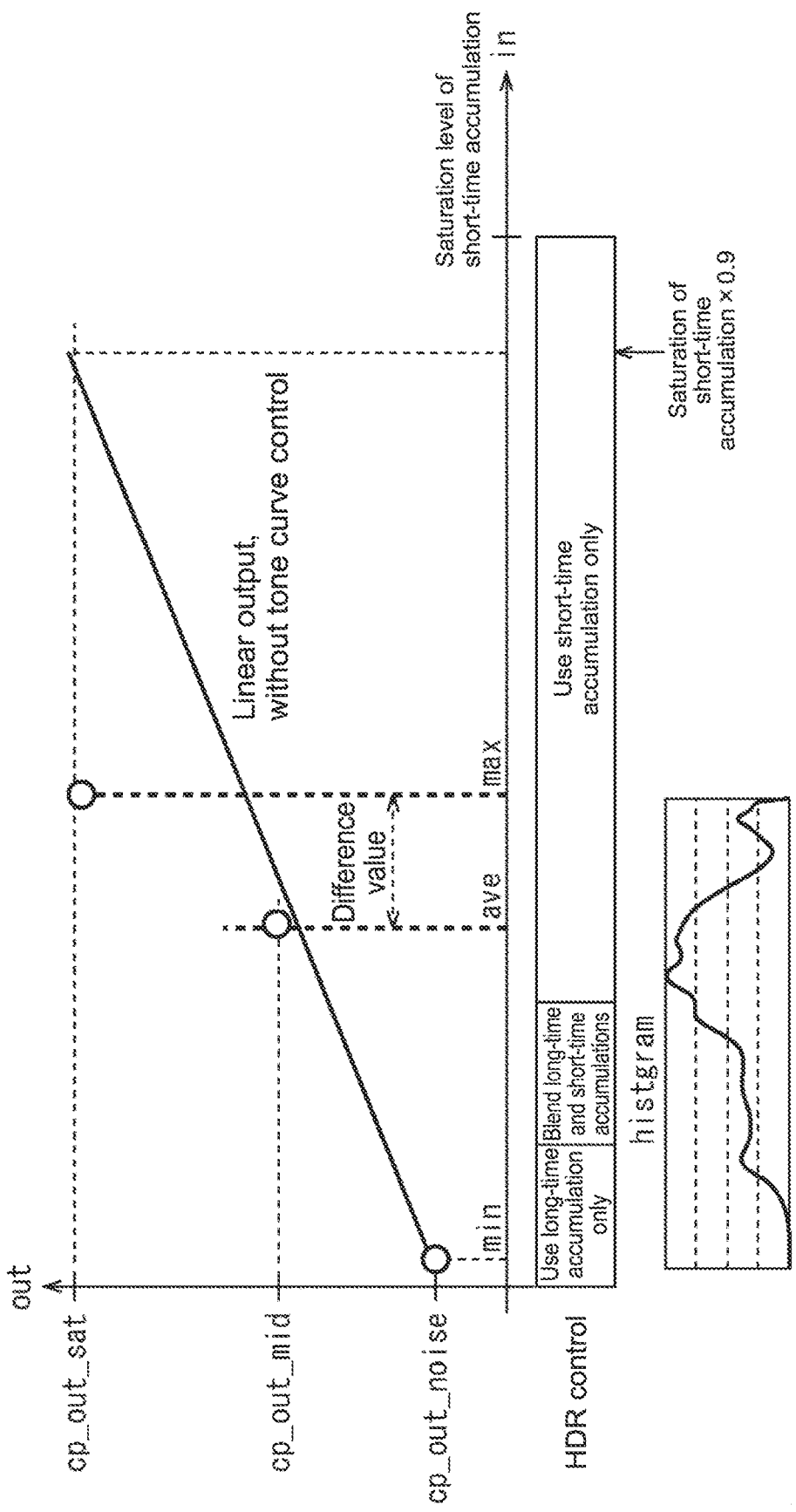
FIG. 13 is a diagram describing a linear tone curve used for a scene which is almost all white.

FIG. 13 shows a tone curve generated in such a manner that a certain value and the minimum value "min" of the luminance signals L of the input image are linearly connected. The certain value is a value of a certain ratio (e.g., 0.9 times) to the saturation level of the short-time accumulation, with which the maximum value "max" has been replaced. By performing luminance gradation compression using this tone curve by the global luminance gradation compression processor 18, it becomes possible to avoid such a case where the tone compression would be performed in such a manner that the image has relatively strong lens shading or the like. Therefore, even in a scene in which the input image is almost all white as in cases where an image of a white wall is taken, it is possible to avoid such a case where the deterioration of image quality occurs in the image resulting from performing luminance gradation compression.

Figure 14:
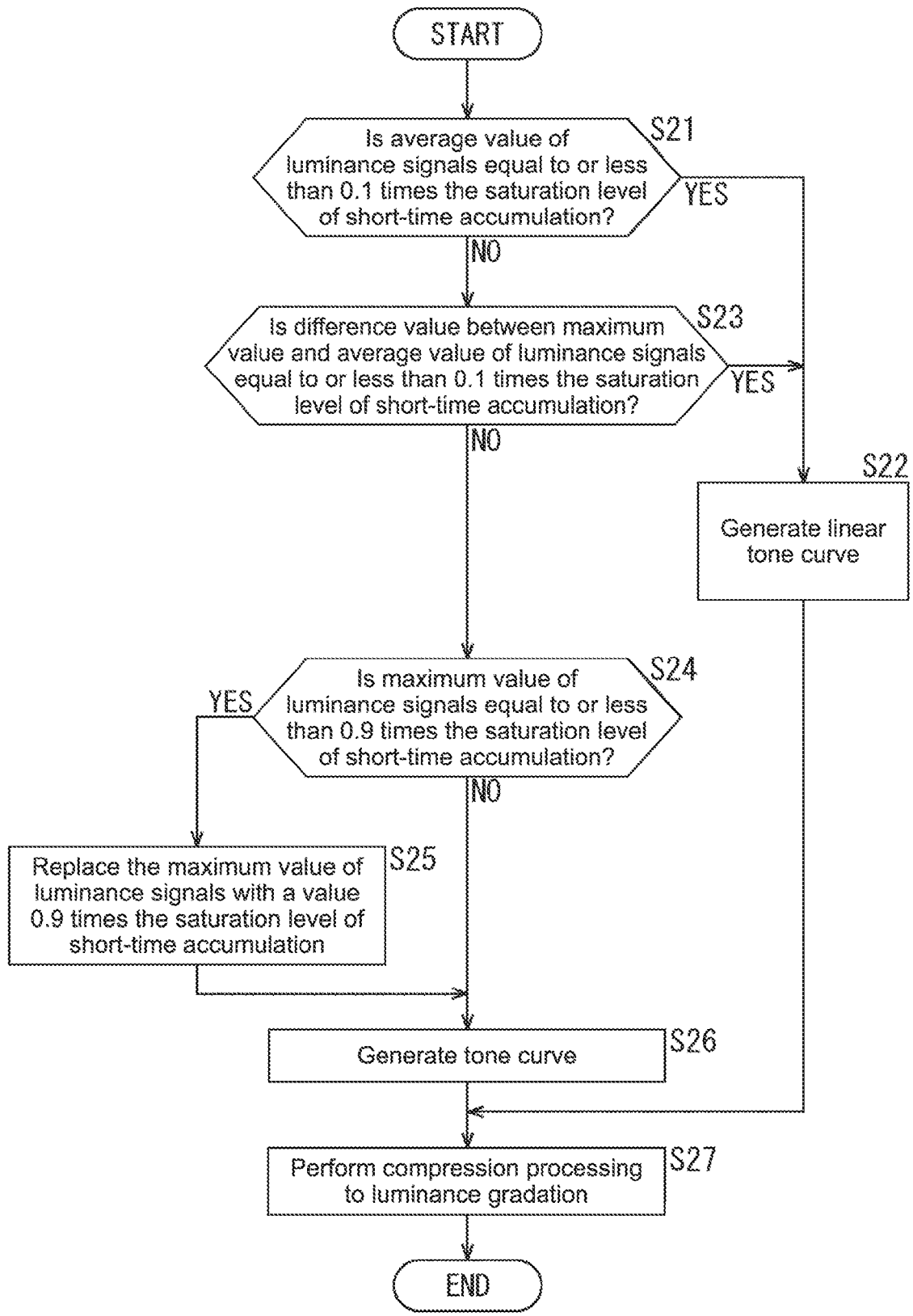
FIG. 14 is a flowchart describing determination performed by a determination unit.

Next, with reference to the flowchart of FIG. 14, determination performed by the determination unit 16 will be described.

For example, when the minimum value "min", the maximum value "max" and the average value "ave" of the luminance signals L of the input image are provided from the extraction unit 15 to the determination unit 16, the processing would be started.

In step S21, the determination unit 16 determines whether or not the average value "ave" of the luminance signals L of the input image is equal to or less than 0.1 times the saturation level of the short-time accumulation.

If the determination unit 16 determines in step S21 that the average value "ave" of the luminance signals L of the input image is equal to or less than 0.1 times the saturation level of the short-time accumulation, the process goes on to step S22. In step S22, the determination unit 16 instructs the tone curve generator 17 to make a linear output, and provides the tone curve generator 17 with the minimum value "min", the maximum value "max" and the average value "ave" of the luminance signals L of the input image. Following this instruction, the tone curve generator 17 generates a linear tone curve such that the maximum value "max" and the minimum value "min" of the luminance signals L of the input image are linearly connected; and provides this tone curve to the global luminance gradation compression processor 18. In such a way, for example, as described above with reference to FIG. 9, even if the luminance gradation compression is to be performed for a dark scene where the average value "ave" of the luminance signals L of the input image becomes lower than a certain level, it would be able to avoid such a case where noises in the image become noticeable.

Besides, if the determination unit 16 determines in step S21 that the average value "ave" of the luminance signals L of the input image is not equal to or less than 0.1 times the saturation level of the short-time accumulation (greater than 0.1 times the saturation level), the process goes on to step S23.

In step S23, the determination unit 16 determines whether or not the difference value between the average value "ave" and the maximum value "max" of the luminance signals L of the input image is equal to or less than 0.1 times the saturation level of the short-time accumulation.

If the determination unit 16 determines in step S23 that the difference value between the average value "ave" and the maximum value "max" of the luminance signals L of the input image is equal to or less than 0.1 times the saturation level of the short-time accumulation, the process goes on to step S22; and the process as described above is performed. In such a way, for example, as described above with reference to FIG. 7, even if the luminance gradation compression is to be performed for a scene in which the input image is almost all white as in cases where an image of a white wall is taken, it would be able to avoid such a case where the deterioration of image quality occurs in the image, such as having relatively strong lens shading.

Besides, if the determination unit 16 determines in step S23 that the difference value between the average value "ave" and the maximum value "max" of the luminance signals L of the input image is not equal to or less than 0.1 times the saturation level of the short-time accumulation (greater than 0.1 times the saturation level), the process goes on to step S24.

In step S24, the determination unit 16 determines whether or not the maximum value "max" of the luminance signals L of the input image is equal to or less than 0.9 times the saturation level of the short-time accumulation.

If the determination unit 16 determines in step S24 that the maximum value "max" of the luminance signals L of the input image is equal to or less than 0.9 times the saturation level of the short-time accumulation, the process goes on to step S25. In step S25, the determination unit 16 replaces the maximum value "max" of the luminance signals L of the input image with a value 0.9 times the saturation level of the short-time accumulation; provides this value to the tone curve generator 17; and also provides the minimum value "min" and the average value "ave" of the luminance signals L of the input image to the tone curve generator 17.

After the process of step S25, the process goes on to step S26; and the tone curve generator 17 generates a tone curve. In this case, as described above with reference to FIG. 9, the tone curve generator 17 generates a tone curve in which the maximum value "max" of the luminance signals L of the input image has been replaced with the value 0.9 times the saturation level of the short-time accumulation. Thus, even if the luminance gradation compression is to be performed for a scene in which the minimum value "min" and the maximum value "max" of the luminance signals L of the input image fall within a single shutter (short-time accumulation only), it is possible to avoid such a case where the image becomes visually unappealing as if its dynamic range is narrowed.

On the other hand, if the determination unit 16 determines in step S24 that the maximum value "max" of the luminance signals L of the input image is not equal to or less than 0.9 times the saturation level of the short-time accumulation (greater than 0.9 times the saturation level), the process goes on to step S26. In this case, the determination unit 16 provides the tone curve generator 17 with the minimum value "min", the maximum value "max" and the average value "ave" of the luminance signals L of the input image. The tone curve generator 17 generates a tone curve as in a usual process.

After the process of step S22 or step S26, the process goes on to step S27. In step S27, the global luminance gradation compression processor 18 performs compression processing of the luminance gradation to the global luminance logarithm value logGL being provided from the global luminance generator 14, using the tone curve being generated by the tone curve generator 17; and thus the processing ends.

Therefore, as described above, by using the tone curve that is generated according to the determination based on the short-time accumulation as a reference, the image processing apparatus 11 is capable of performing tone compression which is able to prevent deterioration of image quality, with a simple configuration.

That is, for example, the image processing apparatus 11 uses the tone curve that is generated by replacing the maximum value "max" of the luminance signals L of the input image with the value 0.9 times the saturation level of the short-time accumulation, for such a scene that is substantially not a wide dynamic range scene, the scene having the minimum value "min", the maximum value "max" and the average value "ave" all falling within the short-time accumulation only. This allows performing tone compression to this scene, in such a way as to an image having nearly the same level of dynamic range as that of an image being imaged by accumulating light for a single time length (as that of an ordinary image). It thus makes it possible to avoid such a case where the image becomes visually unappealing as if its dynamic range is narrowed.

In addition, for example, the image processing apparatus 11 uses the linear tone curve, for a dark scene where the average value "ave" of the luminance signals L of the input image becomes lower than a certain level, such that the average value "ave" of the luminance signals L of the input image is equal to or less than 0.1 times the saturation level of the short-time accumulation. This makes it possible to avoid such a case where the tone compression would be performed in such a manner that the dark input signals are raised, and thus can suppress the noise in the dark scene.

Furthermore, for example, the image processing apparatus 11 uses the linear tone curve, for a scene in which the input image is almost all white, such that the difference value between the average value "ave" and the maximum value "max" of the luminance signals L of the input image is equal to or less than 0.1 times the saturation level of the short-time accumulation. This makes it possible to avoid such a case where the deterioration of image quality occurs in the image, such as having relatively strong lens shading.

In addition, although a case described in the above embodiment was, for example, a case of the dark scene where the average value "ave" of the luminance signals L of the input image becomes lower than a certain level and where the tone curve generator 17 in response generates the tone curve such that the maximum value "max" and the minimum value "min" of the luminance signals L of the input image are linearly connected; the tone curve may not necessarily be a completely straight line.

Figure 15:
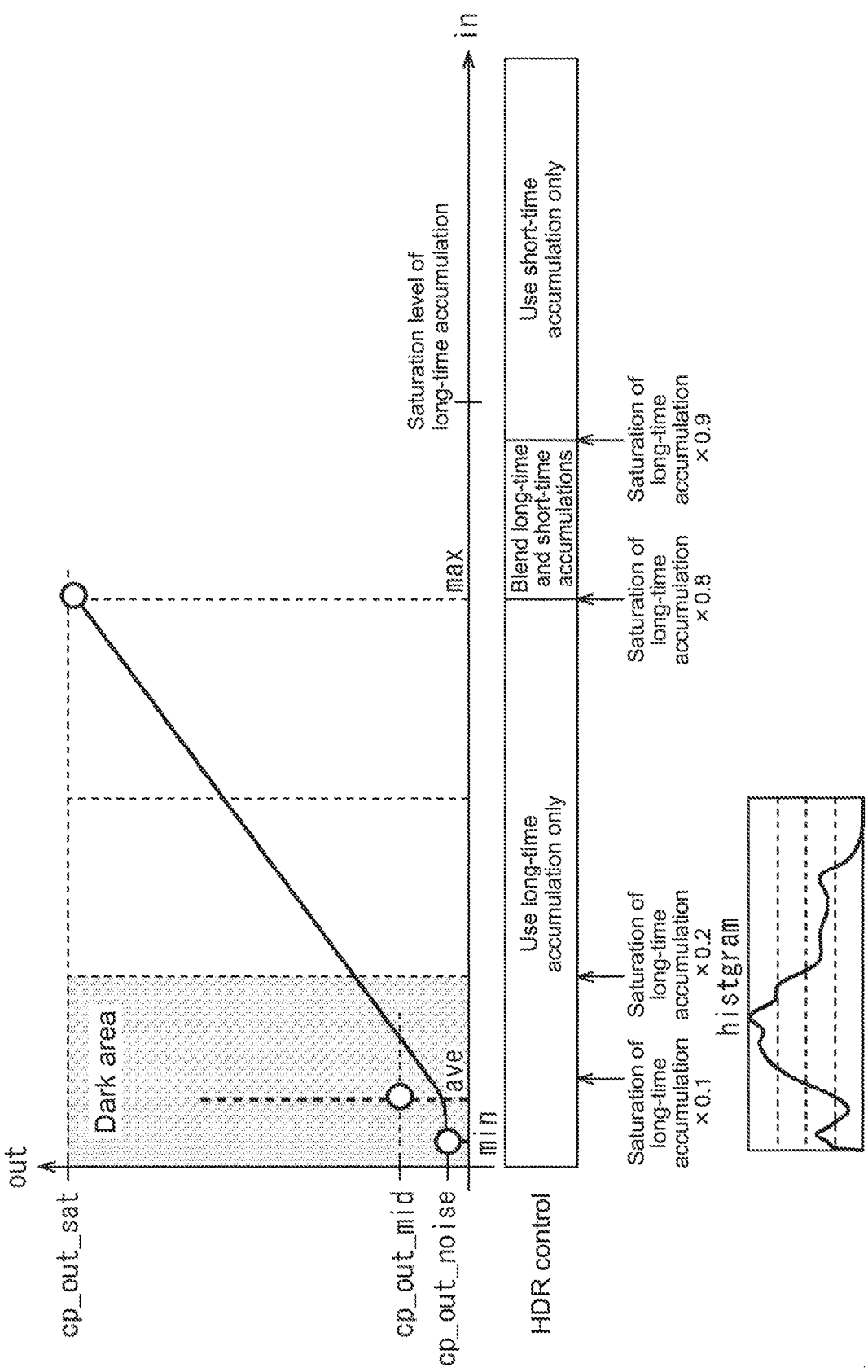
FIG. 15 is a diagram describing a tone curve used for a darker scene.

For example, as shown in FIG. 15, with the image processing apparatus 11, for a darker scene where the average value "ave" of the luminance signals L of the input image becomes even lower with respect to the certain level, processing would be performed to reduce noises. For example, in cases where the average value "ave" of the luminance signals L of the input image is equal to or lower than a certain level, the output noise value "cp_out_noise" would be output when it is in the range of equal to or lower than the average value "ave" of the luminance signals L of the input image; and a tone curve would be generated in a linear fashion toward the maximum value "max" of the luminance signals L of the input image, in the range of equal to or more than the average value "ave" of the luminance signals L of the input image. That is, a tone curve in which the output equal to or lower than the average value of the luminance signals of the input image is suppressed would be generated.

Specifically, in the image processing apparatus 11, the determination unit 16 compares the difference value between the maximum value "max" and the average value "ave" of the luminance signals L of the input image and a value 0.1 times the saturation level of the long-time accumulation. Then, if the determination unit 16 has determined that the difference value between the maximum value "max" and the average value "ave" of the luminance signals L of the input image was equal to or less than 0.1 times the saturation level of the long-time accumulation, the tone curve in which the output equal to or lower than the average value of the luminance signals of the input image is suppressed would be generated. In such a way, for example, as compared to a case where the linear tone curve as described with reference to FIG. 5 is used, it would be able to output the image by reducing noises, for even darker scenes.

Note that the determination unit 16 may perform any determination that is based on the saturation level of the long-time accumulation as a reference. For example, it may be possible to perform determination using, as a reference, a value of a certain ratio (0.1 times in the above-described example) to the saturation level of the long-time accumulation; or perform determination using, as a reference, a certain offset from the saturation level of the long-time accumulation. In addition, the determination unit 16 may perform determination using, as a reference, a value calculated from the certain ratio and the certain offset for the saturation level of the long-time accumulation as well.

Such an image processing apparatus 11 as in the above-described embodiment may be applied to, for example, imaging systems such as digital still cameras and digital video cameras; mobile phones and other apparatuses provided with imaging function; and various electronic apparatuses.

Figure 16:
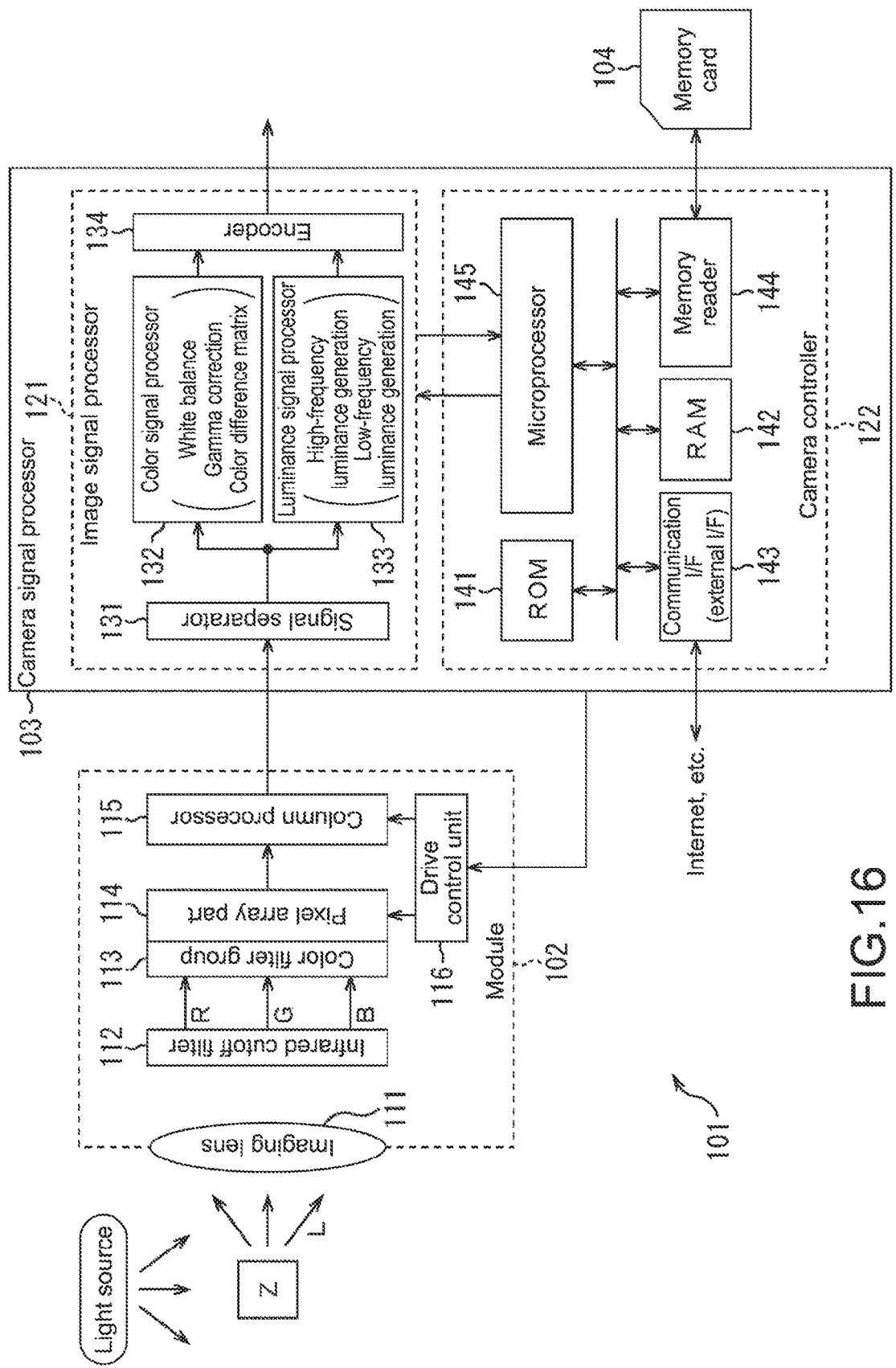
FIG. 16 is a block diagram showing a configuration example of an imaging apparatus.

FIG. 16 is a block diagram showing a configuration example of an imaging apparatus which is an electronic apparatus to which the image processing apparatus 11 is applied.

As shown in FIG. 16, an imaging apparatus 101 includes a module 102 and a camera signal processor 103. The imaging apparatus 101 images a subject Z under a light source such as the sunlight and a fluorescent light; and outputs a visible light color image.

The module 102 includes an imaging lens 111, an infrared cutoff filter 112, a color filter group 113, a pixel array part 114, a column processor 115 and a drive control unit 116.

The imaging lens 111 allows the light from the subject Z to be guided to an inside of the imaging apparatus 101, to take in image information. The color filter group 113 has color filters of, for example, red (R), green (G) and blue (B) arranged in a Bayer array, to transmit light of each color. On the pixel array part 114, a plurality of pixels is arranged in an array. The pixel array part 114 receives the light at each of the pixels, the light coming from the subject Z; and outputs pixel signals of levels each corresponding to the received amount of light.

The column processor 115 may perform CDS (Correlated Double Sampling), AD (Analog Digital) conversion processing, and the like, on the pixel signals output from the pixel array part 114. The drive control unit 116 drives the pixel array part 114 and the column processor 115 under the control of, for example, a camera controller 122 that the camera signal processor 103 includes. Then, imaging data to be output from the column processor 115 would be provided to an image signal processor 121 that the camera signal processor 103 includes.

The camera signal processor 103 includes the image signal processor 121 and the camera controller 122. The image signal processor 121 includes a signal separator 131, a color signal processor 132, a luminance signal processor 133 and an encoder 134.

The signal separator 131 is provided with a function of primary color separation, to separate digital imaging signals being provided from the column processor 115 into primary color signals of red signals R, green signals G and blue signals B, when something other than a primary color filter is used in the color filter group 113. The color signal processor 132 performs signal processing regarding color signals C, based on the red signals R, green signals G and blue signals B being separated by the signal separator 131.

The luminance signal processor 133 performs signal processing regarding luminance signals Y, based on the red signals R, green signals G and blue signals B being separated by the signal separator 131. That is, the luminance signal processor 133 is provided with the function of the image processing apparatus 11 of FIG. 1, and performs the luminance gradation compression processing as described above. The encoder 134 generates video signals VD, based on the color signals C output from the color signal processor 132 and the luminance signals Y output from the luminance signal processor 133.

The camera controller 122 has a function as a main controller that controls the entire part of the imaging apparatus 101. The camera controller 122 includes a ROM (Read Only Memory) 141, a RAM (Random Access Memory) 142, a communication I/F (Interface) 143, a memory reader 144 and a microprocessor 145.

The ROM 141 is storage intended for reading out, which stores a control program of the camera controller 122, and the like. In addition, there is also stored a program for setting the timing to turn on/off various control pulses by the camera controller 122.

The RAM 142 is capable of writing and reading out as needed, and the RAM 142 is an example of volatile storage, where the data for allowing the camera controller 122 to perform various pieces of processing. Herein, the "volatile storage" means the storage having a form in which the stored content would be deleted when the power of the apparatus is switched off. On the other hand, "non-volatile storage" means the storage having a form in which the stored content would be retained even when the main power of the apparatus is switched off. The "non-volatile storage" may be in any form as long as it is capable of retaining the content being stored; which is not limited to a form of a semiconductor memory element itself having non-volatility, but may also include a configuration made by providing a volatile memory element with a backup power supply so that the volatile memory element can have the "non-volatility".

The communication I/F 143 mediates transmission of communication data with communication network such as the Internet.

The memory reader 144 stores (installs) the data read out from a memory card 104 to the RAM 142.

The memory card 104 is configured to be attachable and detachable to the camera controller 122, and for example, it is used for such as registering program data for allowing the microprocessor 145 to perform software processing. Further, the memory card 104 would be used for such as registering data. Such data include various set values such as on/off timing of various control pulses for controlling a range of convergence of photometric data DL based on the luminance signals from the luminance signal processor 133, or for exposure control processing (including electronic shutter control).

The microprocessor 145 is the center of an electronic computer, which is represented by a CPU (Central Processing Unit), in which the functions of computation and control to be executed by a computer are gathered into a microminiature integrated circuit.

In addition, in the camera controller 122 of the imaging apparatus 101, a program for exposure control is also incorporated in the microprocessor 145 so that the microprocessor 145 also functions as an exposure condition controller that controls conditions for exposure. The program that causes the microprocessor 145, which is the center of the electronic computer, to function as the exposure condition controller that controls conditions for exposure may include one for calculating the photometric data DL based on the luminance signals from the luminance signal processor 133 (e.g., calculating average value for photometric area of a predetermined size at a predetermined position); for determination of a luminance level (whether it is high or low compared to an intermediate level) based on the result of the calculation; and the like.

Note that, although there is shown such an imaging apparatus 101 in which the drive control unit 116 and the column processor 115 are independent from the pixel array part 114 and are each made in a form of a module, it is also possible to use a single-chip one having these parts integrally formed on the same semiconductor substrate as the pixel array part 114.

Further, in FIG. 16, the imaging apparatus 101 is shown in such a state that includes an optical system such as the imaging lens 111 and the infrared cutoff filter 112, in addition to the pixel array part 114, the drive control unit 116, the column processor 115 and the camera signal processor 103. This mode is suitable when they are packaged together to be made into a module form having the imaging function.

Here, as a relation with the module of a solid state imaging apparatus, it is also possible to provide the solid state imaging apparatus in the state where the pixel array part 114 (imaging unit) and a signal processor such as the column processor 115 having AD conversion function and difference (CDS) processing function, the signal processor being closely associated with the pixel array part 114 side (where the camera signal processor at the subsequent part of the column processor 115 is excluded) are packaged together to be made into a module form having the imaging function, as shown in the figure. It is possible to make up the whole imaging apparatus 101 by providing the camera signal processor 103, which is the remaining part of the signal processor, to the subsequent part of this solid state imaging apparatus that is provided in the module form.

Alternatively, although not shown in the figure, it is also possible to provide the solid state imaging apparatus in the state where the pixel array part 114 (imaging unit) and the optical system such as the imaging lens 111 are packaged together to be made into a module form having the imaging function; and make up the whole imaging apparatus 101 by providing the camera signal processor 103 in the module as well, in addition to this solid state imaging apparatus that is provided in the module form.

Furthermore, the camera signal processor 103 may be included in the module form of the solid state imaging apparatus. In this case, in effect, the solid state imaging apparatus can be regarded as substantially the same thing as the imaging apparatus 101.

Such an imaging apparatus 101 may be provided as, for example, a camera or a mobile device having imaging function, for performing "imaging". It should be noted that the term "imaging" is used in a broad sense which means not only taking images by normal imaging with cameras, but also includes fingerprint detection and the like. The imaging apparatus 101 having such a configuration may include all the functions of the image processing apparatus of FIG. 1 as described above, and may have substantially the same basic configuration and behavior.

Note that the pieces of processing described above with reference to the flowcharts are not necessarily processed in a time series manner along the order which is described in the flowchart. The processing may also include pieces of processing which are executed in parallel or executed individually (e.g., parallel processing or object processing). In addition, the program may be one which is processed by a single CPU, or may be one which is processed by a plurality of CPUs in a distributed manner.

The above series of processing (image processing method) may be executed by hardware, and may be executed by software. In cases where the series of processing is executed by software, a program constituting the software may be installed into a computer incorporated in dedicated hardware, or into a general-purpose personal computer capable of executing various functions with various programs installed therein, or the like, from a program recording medium in which the program is recorded.

Figure 17:
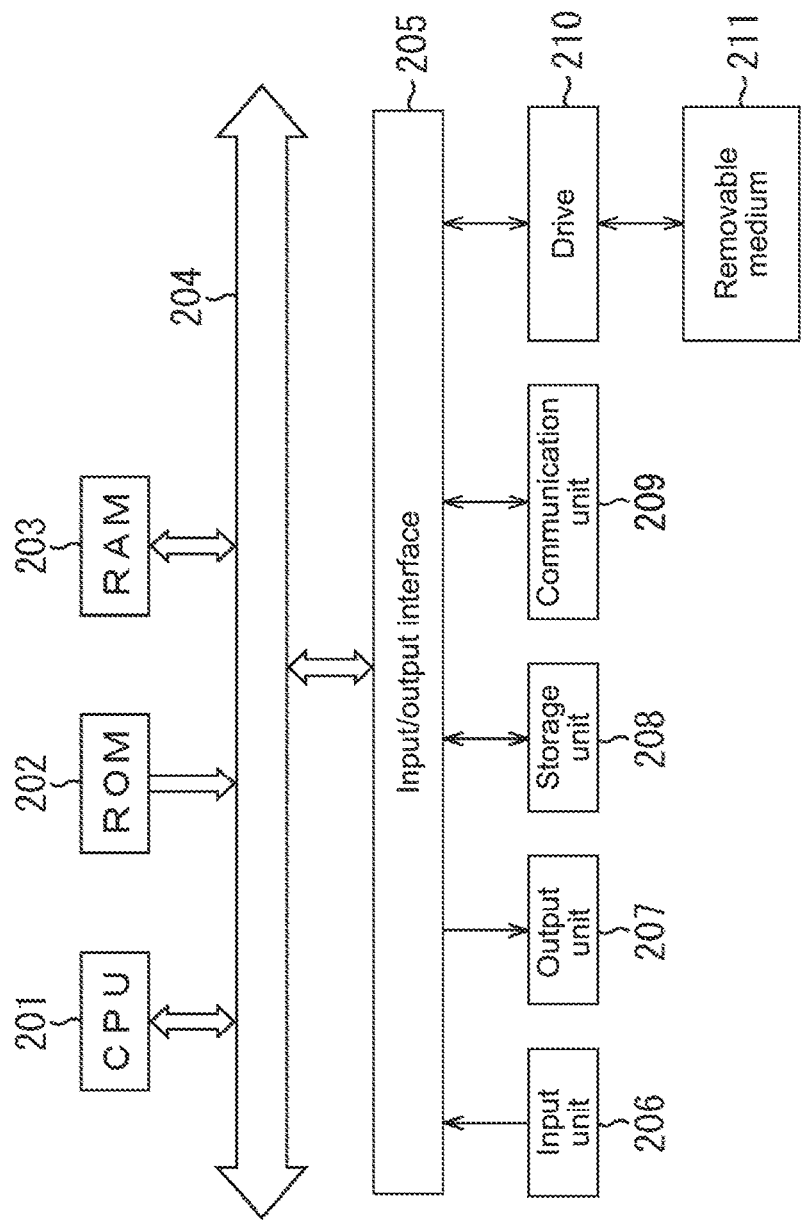
FIG. 17 is a block diagram showing a configuration example of a computer.

FIG. 17 is a block diagram showing a configuration example of the hardware of a computer that executes the above series of processing with a program.

In the computer, a CPU 201, a ROM 202, and a RAM 203 are connected to one another by a bus 204. The bus 204 is also connected to an input/output interface 205. The input/output interface 205 is connected to an input unit 206 which may include a keyboard, a mouse, a microphone or the like; an output unit 207 which may include a display, a speaker or the like; a storage unit 208 which may include a hard disk, a non-volatile memory or the like; a communication unit 209 which may include a network interface; and a drive 210 that drives a removable medium 211 such as a magnetic disk, an optical disk, a magnet-optical disk, and a semiconductor memory.

In the computer thus configured, the above series of processing is executed, for example, when the CPU 201 loads a program stored in the storage unit 208 into the RAM 203 and executes the same via the input/output interface 205 and the bus 204.

For example, the program to be executed by the computer 200 (CPU 201) may be provided in a state of being recorded on the removable medium 211 serving as a package medium including a magnetic disk (including flexible disk), an optical disk (CD-ROM (Compact Disc-Read Only Memory), DVD (Digital Versatile Disc), etc.), a magneto-optical disk, or a semiconductor memory; or may be provided via a wired or wireless transmission medium such as a local area network, the Internet, and digital satellite broadcasting.

The program may be installed in the storage unit 208 via the input/output interface 205 when the removable medium 211 is attached to the drive 210. In addition, the program may be received by the communication unit 209 via a wired or wireless transmission medium and installed in the storage unit 208. Besides, the program may be installed in advance in the ROM 202 or the storage unit 208.

The present disclosure may employ the following configurations.

(1) An image processing apparatus, including:
 a comparing unit configured to perform comparison using at least one of a maximum value and an average value of luminance signals of an input image, with a saturation level as a reference of comparison, the saturation level being a level of light accumulation performed for a predetermined time length, the predetermined time length being one out of a plurality of time lengths for accumulating light in imaging of the input image;
 a tone curve generator configured to generate a tone curve to be used for performing compression processing to luminance gradation of the input image, on the basis of a result of comparison made by the comparing unit; and
 a luminance gradation compression processor configured to perform compression processing to luminance gradation of the input image, according to the tone curve being generated by the tone curve generator.

(2) The image processing apparatus according to (1), in which
 the comparing unit is configured to compare the maximum value of the luminance signals of the input image with a first reference value, the first reference value being based on the saturation level of the accumulation for the predetermined time length as a reference, and
 the tone curve generator is configured to,
  if the maximum value of the luminance signals of the input image is equal to or lower than the first reference value, replace the maximum value of the luminance signals of the input image with the first reference value, to generate the tone curve.

(3) The image processing apparatus according to (1) or (2), in which
 the comparing unit is configured to compare the average value of the luminance signals of the input image with a second reference value, the second reference value being based on the saturation level of the accumulation for the predetermined time length as a reference, and
 the tone curve generator is configured to,
  if the average value of the luminance signals of the input image is equal to or lower than the second reference value, generate the tone curve in a linear fashion.

(4) The image processing apparatus according to any one of (1) to (3), in which
 the comparing unit is configured to compare a difference value between the maximum value and the average value of the luminance signals of the input image with a third reference value, the third reference value being based on the saturation level of the accumulation for the predetermined time length as a reference, and
 the tone curve generator is configured to,
  if the difference value between the maximum value and the average value of the luminance signals of the input image is equal to or lower than the third reference value, generate the tone curve in a linear fashion.

(5) The image processing apparatus according to any one of (1) to (4), in which
 the comparing unit is configured to,
  when light is accumulated by a long-time accumulation and a short-time accumulation in the imaging of the input image, perform the comparison perform the comparison using the saturation level of the long-time accumulation as the reference of comparison.

(6) The image processing apparatus according to any one of (1) to (4), in which
 the comparing unit is configured to,
  when light is accumulated by a long-time accumulation and a short-time accumulation in the imaging of the input image, perform the comparison using the saturation level of the short-time accumulation as the reference of comparison.

(7) The image processing apparatus according to any one of (1) to (6), in which
 the comparing unit is configured to compare the average value of the luminance signals of the input image with a fourth reference value, the fourth reference value being based on the saturation level of the accumulation for the predetermined time length as a reference, and
 the tone curve generator is configured to,
  if the average value of the luminance signals of the input image is equal to or lower than the fourth reference value, generate the tone curve which suppresses an output equal to or lower than the average value of the luminance signals of the input image.

(8) An image processing method including:
 performing comparison using at least one of a maximum value and an average value of luminance signals of an input image, with a saturation level as a reference of comparison, the saturation level being a level of light accumulation performed for a predetermined time length, the predetermined time length being one out of a plurality of time lengths for accumulating light in imaging of the input image;
 generating a tone curve to be used for performing compression processing to luminance gradation of the input image, on the basis of a result of comparison being made; and
 performing compression processing to luminance gradation of the input image, according to the tone curve being generated.

(9) A program to cause a computer to execute image processing including:
 performing comparison using at least one of a maximum value and an average value of luminance signals of an input image, with a saturation level as a reference of comparison, the saturation level being a level of light accumulation performed for a predetermined time length, the predetermined time length being one out of a plurality of time lengths for accumulating light in imaging of the input image;
 generating a tone curve to be used for performing compression processing to luminance gradation of the input image, on the basis of a result of comparison being made; and
 performing compression processing to luminance gradation of the input image, according to the tone curve being generated.

(10) An electronic apparatus, including
 an image processing apparatus, having a comparing unit configured to perform comparison using at least one of a maximum value and an average value of luminance signals of an input image, with a saturation level as a reference of comparison, the saturation level being a level of light accumulation performed for a predetermined time length, the predetermined time length being one out of a plurality of time lengths for accumulating light in imaging of the input image, a tone curve generator configured to generate a tone curve to be used for performing compression processing to luminance gradation of the input image, on the basis of a result of comparison made by the comparing unit, and a luminance gradation compression processor configured to perform compression processing to luminance gradation of the input image, according to the tone curve being generated by the tone curve generator.

In addition, the embodiments of the present disclosure are not limited to the aforementioned embodiments, and various modifications are available within the scope without departing from the gist of the present disclosure.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a comparing unit configured to perform a comparison using at least one of a maximum value and an average value of luminance signals of an input image, with a saturation level as a reference of comparison, the saturation level being a level of light accumulation performed for a predetermined time length, the predetermined time length being one out of a plurality of time lengths for accumulating light in imaging of the input image;

a tone curve generator configured to generate a tone curve to be used for performing compression processing to a luminance gradation of the input image, on the basis of a result of the comparison made by the comparing unit; and a luminance gradation compression processor configured to perform compression processing to the luminance gradation of the input image, according to the tone curve being generated by the tone curve generator.

2. The image processing apparatus according to claim 1, wherein
the comparing unit is configured to compare the maximum value of the luminance signals of the input image with a first reference value, the first reference value being based on the saturation level of the light accumulation for the predetermined time length as a reference, and the tone curve generator is configured to,
if the maximum value of the luminance signals of the input image is equal to or lower than the first reference value, replace the maximum value of the luminance signals of the input image with the first reference value, to generate the tone curve.

3. The image processing apparatus according to claim 1, wherein
the comparing unit is configured to compare the average value of the luminance signals of the input image with a second reference value, the second reference value being based on the saturation level of the light accumulation for the predetermined time length as a reference, and the tone curve generator is configured to,
if the average value of the luminance signals of the input image is equal to or lower than the second reference value, generate the tone curve in a linear fashion.

4. The image processing apparatus according to claim 1, wherein
the comparing unit is configured to compare a difference value between the maximum value and the average value of the luminance signals of the input image with a third reference value, the third reference value being based on the saturation level of the light accumulation for the predetermined time length as a reference, and the tone curve generator is configured to,
if the difference value between the maximum value and the average value of the luminance signals of the input image is equal to or lower than the third reference value, generate the tone curve in a linear fashion.

5. The image processing apparatus according to claim 1, wherein
the comparing unit is configured to,
when light is accumulated by a long-time accumulation and a short-time accumulation in the imaging of the input image, perform the comparison using the saturation level of the long-time accumulation as the reference of comparison.

6. The image processing apparatus according to claim 1, wherein
the comparing unit is configured to,
when light is accumulated by a long-time accumulation and a short-time accumulation in the imaging of the input image, perform the comparison using the saturation level of the short-time accumulation as the reference of comparison.

7. The image processing apparatus according to claim 1, wherein
the comparing unit is configured to compare the average value of the luminance signals of the input image with a fourth reference value, the fourth reference value being based on the saturation level of the accumulation for the predetermined time length as a reference, and the tone curve generator is configured to,
if the average value of the luminance signals of the input image is equal to or lower than the fourth reference value, generate the tone curve which suppresses an output equal to or lower than the average value of the luminance signals of the input image.

8. An image processing method comprising:
performing a comparison using at least one of a maximum value and an average value of luminance signals of an input image, with a saturation level as a reference of comparison, the saturation level being a level of light accumulation performed for a predetermined time length, the predetermined time length being one out of a plurality of time lengths for accumulating light in imaging of the input image;

generating a tone curve to be used for performing compression processing to a luminance gradation of the input image, on the basis of a result of the comparison being made; and performing compression processing to the luminance gradation of the input image, according to the tone curve being generated.

9. An electronic apparatus, comprising
an image processing apparatus, having
a comparing unit configured to perform a comparison using at least one of a maximum value and an average value of luminance signals of an input image, with a saturation level as a reference of comparison, the saturation level being a level of light accumulation performed for a predetermined time length, the predetermined time length being one out of a plurality of time lengths for accumulating light in imaging of the input image,
a tone curve generator configured to generate a tone curve to be used for performing compression processing to a luminance gradation of the input image, on the basis of a result of the comparison made by the comparing unit, and
a luminance gradation compression processor configured to perform compression processing to the luminance gradation of the input image, according to the tone curve being generated by the tone curve generator.

10. The electronic apparatus according to claim 9, wherein
the comparing unit is configured to compare the maximum value of the luminance signals of the input image with a first reference value, the first reference value being based on the saturation level of the light accumulation for the predetermined time length as a reference, and
the tone curve generator is configured to,
if the maximum value of the luminance signals of the input image is equal to or lower than the first reference value, replace the maximum value of the luminance signals of the input image with the first reference value, to generate the tone curve.

11. The electronic apparatus according to claim 9, wherein
the comparing unit is configured to compare the average value of the luminance signals of the input image with a second reference value, the second reference value being based on the saturation level of the light accumulation for the predetermined time length as a reference, and
the tone curve generator is configured to,
if the average value of the luminance signals of the input image is equal to or lower than the second reference value, generate the tone curve in a linear fashion.

12. The electronic apparatus according to claim 9, wherein
the comparing unit is configured to compare a difference value between the maximum value and the average value of the luminance signals of the input image with a third reference value, the third reference value being based on the saturation level of the light accumulation for the predetermined time length as a reference, and
the tone curve generator is configured to,
if the difference value between the maximum value and the average value of the luminance signals of the input image is equal to or lower than the third reference value, generate the tone curve in a linear fashion.

13. The electronic apparatus according to claim 9, wherein
the comparing unit is configured to,
when light is accumulated by a long-time accumulation and a short-time accumulation in the imaging of the input image, perform the comparison using the saturation level of the long-time accumulation as the reference of comparison.

14. The electronic apparatus according to claim 9, wherein
the comparing unit is configured to,
when light is accumulated by a long-time accumulation and a short-time accumulation in the imaging of the input image, perform the comparison using the saturation level of the short-time accumulation as the reference of comparison.

15. The electronic apparatus according to claim 9, wherein
the comparing unit is configured to compare the average value of the luminance signals of the input image with a fourth reference value, the fourth reference value being based on the saturation level of the accumulation for the predetermined time length as a reference, and
the tone curve generator is configured to,
if the average value of the luminance signals of the input image is equal to or lower than the fourth reference value, generate the tone curve which suppresses an output equal to or lower than the average value of the luminance signals of the input image.

16. The image processing method of claim 8, wherein the comparison includes comparing the maximum value of the luminance signals of the input image with a first reference value, wherein the first reference value is based on the saturation level of the light accumulation for the predetermined time length as a reference, and wherein, if the maximum value of the luminance signals of the input image is equal to or lower than the first reference value, generating a tone curve includes replacing the maximum value of the luminance signals of the input image with the first reference value, to generate the tone curve.

17. The image processing method according to claim 8, wherein the average value of the luminance signals of the input image are compared with a second reference value, the second reference value being based on the saturation level of the accumulation for the predetermined time length as a reference, and wherein, if the average value of the luminance signals of the input image is equal or lower than the second reference value, the tone curve is generated in a linear fashion.

18. The image processing method according to claim 8, wherein a difference value between the maximum and the average value of the luminance signals of the input image is compared with a third reference value, the third reference value being based on the saturation level of the accumulation of the predetermined time length as a reference, wherein, if the difference between the maximum and the average value of the luminance signals of the input image is equal to or lower than the third reference value, the tone curve is generated in a linear fashion.

19. The image processing method according to claim 8, wherein, when light is accumulated by long time accumulation and a short time accumulation in the imaging of the input image, the comparison is preformed using the saturation level of the long time accumulation as the reference of comparison.

20. The image processing method according to claim 8, wherein, when light is accumulated by long time accumulation and a short time accumulation in the imaging of the input image, the comparison is preformed using the saturation level of the short time accumulation as the reference of comparison.

* * * * *